US012777994B2

(12) United States Patent
Kiyosawa et al.

(10) Patent No.: US 12,777,994 B2
(45) Date of Patent: Nov. 3, 2026

(54) CONTROL METHOD OF WORK VEHICLE, CONTROL PROGRAM FOR WORK VEHICLE, CONTROL SYSTEM FOR WORK VEHICLE, AND WORK SYSTEM

(71) Applicant: Yanmar Holdings Co., Ltd., Osaka (JP)

(72) Inventors: Yu Kiyosawa, Osaka (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 10 days.

(21) Appl. No.: 18/903,006

(22) Filed: Oct. 1, 2024

(65) Prior Publication Data

US 2025/0127070 A1 Apr. 24, 2025

(30) Foreign Application Priority Data

Oct. 19, 2023 (JP) ................................ 2023-180090

(51) Int. Cl.

| | |
|---|---|
| ***G05D 1/00*** | (2024.01) |
| ***A01B 69/04*** | (2006.01) |
| ***G05D 1/648*** | (2024.01) |
| *G05D 105/15* | (2024.01) |
| *G05D 107/20* | (2024.01) |
| *G05D 109/10* | (2024.01) |

(52) U.S. Cl.
CPC ........... *A01B 69/008* (2013.01); *G05D 1/648* (2024.01); *G05D 2105/15* (2024.01); *G05D 2107/21* (2024.01); *G05D 2109/10* (2024.01)

(58) Field of Classification Search
CPC ................ A01B 69/008; G05D 1/648; G05D 2105/15; G05D 2107/21; G05D 2109/10
USPC ........................................................... 701/50
See application file for complete search history.

(56) References Cited

U.S. PATENT DOCUMENTS

2021/0397190 A1* 12/2021 Takase ................ G05D 1/0088
2022/0382288 A1* 12/2022 Nakahata .............. G01C 21/20

FOREIGN PATENT DOCUMENTS

JP 2022103649 A 7/2022
KR 20220162046 A 12/2022

* cited by examiner

*Primary Examiner* — Erin M Piateski
*Assistant Examiner* — Michael T Dowling
(74) *Attorney, Agent, or Firm* — Chris Mizumoto

(57) ABSTRACT

The control method of a work vehicle is a control method of the work vehicle, capable of working on a plurality of work rows aligned in a direction intersecting a traveling direction, while traveling in a work site. This control method has acquisition of outline information based on an outline of the work site and setting of a row-stop position for executing row-stop control that sets a part of a plurality of work rows to non-work in the work site on the basis of the outline information.

14 Claims, 12 Drawing Sheets

CONTROL METHOD OF WORK VEHICLE, CONTROL PROGRAM FOR WORK VEHICLE, CONTROL SYSTEM FOR WORK VEHICLE, AND WORK SYSTEM

CROSS-REFERENCE

This application claims foreign priority of JP2023-180090 filed Oct. 19, 2023, the disclosures of which are hereby incorporated by reference in its entirety.

TECHNICAL FIELD

The present invention relates to a control method of a work vehicle that performs a work in a work site while traveling in the work site, a control program for a work vehicle, a control system for a work vehicle, and a work system.

BACKGROUND ART

As a related art, there is known a work vehicle (traveling work machine) including a traveling machine body that travels in a work site (field) and an operating machine (work device) that performs a work and traveling for a work along a target travel route (Patent Document 1, for example). In the work vehicle according to the related art, after a route setting portion sets a teaching route on the basis of teaching travel in which the traveling machine body travels by a manual operation on one end side of the work site, it sets a target travel route parallel to the teaching route on the other end side of the work site and sets a target travel route for a post process for the traveling machine body to travel for a work after having travelled on the target travel route on the side where the teaching route is located on the basis of an existing travel position acquired during the travel of the traveling machine body along the target travel route.

According to this work vehicle, for example, after the work travel was performed along the target travel route for the post process overlapping the teaching route, the traveling machine body travels for the work along a ridge side of the work site, and performs the work (rice planting work) of going around the work site. At this time, since a work width needs to be ensured along the periphery of the ridge side in the work site, row-stop control of disengaging a row clutch of the operating machine is executed for a part overlapping with the work width to be ensured along the periphery of the ridge side in the work widths for which the work travel is performed along the target travel route for the post process.

PRIOR ART DOCUMENT

Patent Document

Patent Document 1: Japanese Unexamined Patent Publication No. 2020-000066

SUMMARY OF INVENTION

Technical Problem

In the configuration of the above-described related art, since an appropriate position for executing the row-stop control is not specified, further improvement of work efficiency for the whole area of the work site is desired.

An object of the present invention is to provide a control method of a work vehicle, a control program for a work vehicle, a control system for a work vehicle, and a work system capable of improving work efficiency with respect to a work site.

Solution to Problem

A control method of a work vehicle according to one aspect of the present invention is a control method of a work vehicle, capable of working on a plurality of work rows aligned in a direction intersecting a traveling direction, while traveling in a work site, the control method including acquiring of outline information based on an outline of the work site and setting of, in the work site, a row-stop position for executing row-stop control that sets a part of the plurality of work rows to non-work on the basis of the outline information.

A control method of a work vehicle according to another aspect of the present invention is a control method of a work vehicle, capable of working on a plurality of work rows aligned in a direction intersecting a traveling direction, while traveling in a work site, the control method including acquiring of outline information based on an outline of the work site and obtaining of an overlapping region of an inner side region in which the work vehicle is caused to reciprocatingly travel along a work direction and an outer peripheral region in which the work vehicle is caused to travel around along an outer periphery of the inner side region on the basis of the outline information.

A control program for a work vehicle according to one aspect of the present invention is a program for causing one or more processors to execute the control method of a work vehicle.

A control system for a work vehicle according to one aspect of the present invention is used for a work vehicle capable of working on a plurality of work rows aligned in a direction intersecting a traveling direction, while traveling in a work site. The control system for a work vehicle includes an acquisition processing unit and a work-support processing unit. The acquisition processing unit acquires outline information based on an outline of the work site. The work-support processing unit sets, in the work site, a row-stop position for executing row-stop control to set a part of the plurality of work rows to non-work on the basis of the outline information.

A work system according to one aspect of the present invention includes the control system for a work vehicle and a machine body of the work vehicle.

Advantageous Effects of Invention

According to the present invention, it is possible to provide a control method of a work vehicle, a control program for a work vehicle, a control system for a work vehicle, and a work system capable of improving work efficiency with respect to a work site.

DESCRIPTION OF EMBODIMENTS

Figure 1:
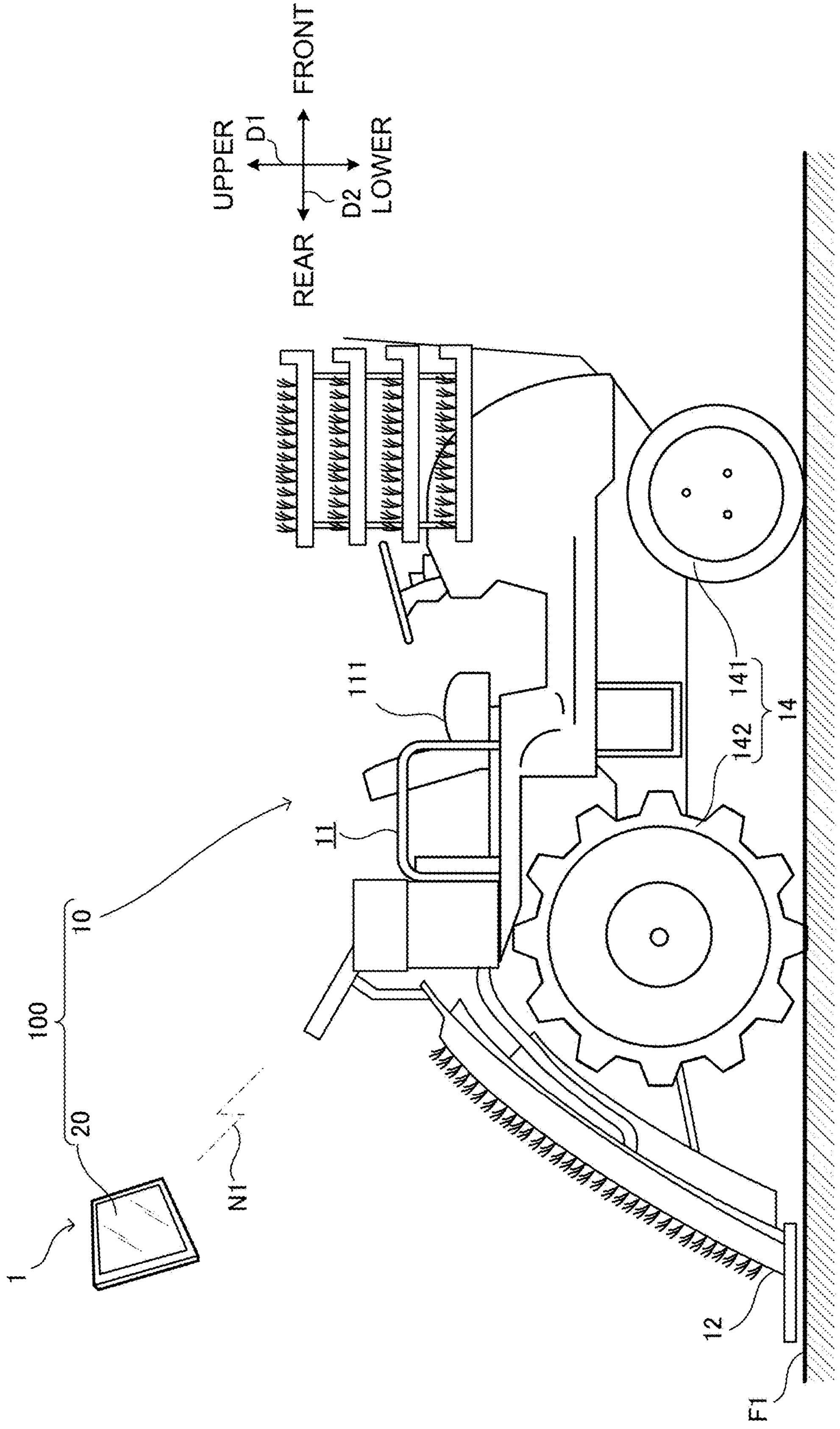
FIG. 1 is a schematic side view showing an appearance of a work vehicle according to an embodiment 1.

Hereinafter, embodiments of the present invention will be explained with reference to the accompanying drawings. The following embodiments are examples that embody the present invention and are not intended to limit the technical scope of the present invention.

Embodiment 1

1 Overall Configuration

First, an overall configuration of a work system 100 according to this embodiment will be explained with reference to FIG. 1 and FIG. 2. A control system 1 for a work vehicle (hereinafter, also simply referred to as a "control system 1") according to this embodiment constitutes the work system 100 together with a machine body 11 of a work vehicle 10. An operating machine 12 is mounted on the machine body 11. In other words, the work system 100 includes the control system 1 for a work vehicle and the machine body 11 of the work vehicle 10.

In this embodiment, the control system 1 includes a control device 13 (see FIG. 2) mounted on the machine body 11 of the work vehicle 10, and a terminal device 20. The work vehicle 10 and the terminal device 20 are communicable with each other. The term "communicable" in the present disclosure means that information can be transmitted/received directly or indirectly via a communication network (network) N1 or a relay or the like by an appropriate communication method such as wired communication or wireless communication (communication using a radio wave or light as a medium). The work vehicle 10 and the terminal device 20 are communicable with each other via the communication network N1 such as the Internet, a local area network (LAN), a wide area network (WAN), a public phone line, a cellular phone line network, a packet line network, or a wireless LAN or the like. Communication means between the work vehicle 10 and the terminal device 20 is not limited to the above-described examples and is realized by appropriate communication means. In addition, it is not an essential configuration in the control system 1 that the work vehicle 10 and the terminal device 20 are communicable with each other.

Figure 3:
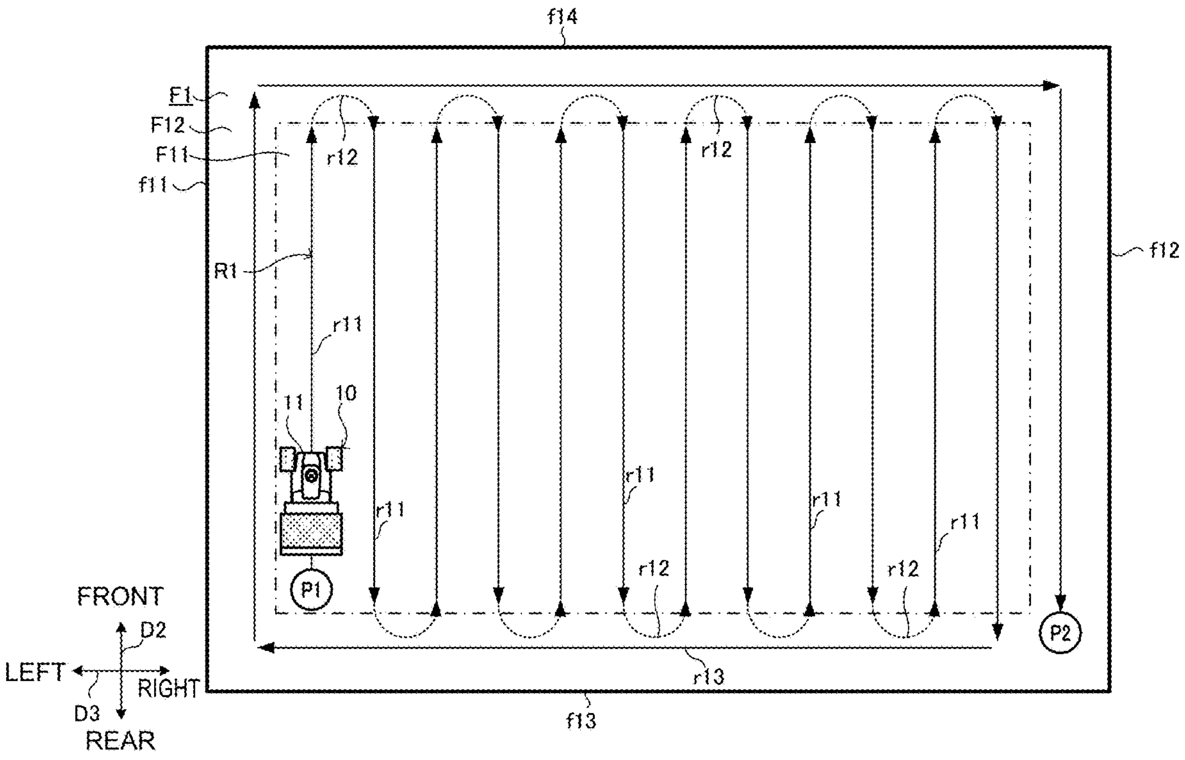
FIG. 3 is a schematic diagram illustrating an example of a target route in a work system according to the embodiment 1.

The work vehicle 10 performs some work in a work site F1 by the operating machine 12 while traveling in the work site F1 (see FIG. 3). The term "work" in this disclosure is a work performed for the work site F1 by the operating machine 12 and includes various types of agricultural work such as planting (rice planting), seeding, fertilizing, spraying of agrochemicals, leveling, harvesting or the like and various types of work such as a construction work and the like, for example. In this embodiment, as an example, the work performed by the work vehicle 10 is assumed to be a planting (rice planting) work in which rice seedling is planted in a paddy field as the work site F1.

The operating machine 12 performs a work in the work site F1 when the machine body 11 of the work vehicle 10 moves in the work site F1. In this embodiment, as an example, the operating machine 12 includes a seedling table on which a seedling mat is placed, a planting arm that picks up the seedling from the seedling mat and plants the seedling and the like so as to perform a planting work of the seedling. Here, the operating machine 12 is attached to a rear side of the machine body 11 (the side opposite to an advancing direction of the machine body 11). That is, the operating machine 12 is connected to the rear side of the machine body 11 and performs the work while moving forward together with the machine body 11, when the machine body 11 moves forward. In this embodiment, the operating machine 12 is assumed to be included in constituent elements of the work vehicle 10, but the operating machine 12 does not have to be included in the constituent elements of the work vehicle 10.

The "work vehicle" referred to in this disclosure means a machine that performs various types of work in the work site F1 such as a field, for example, and is an agricultural machine (farm machine) such as a rice transplanter, a tractor, a seeder, a spreader, a sprayer, a transplanter, and a harvester, for example. The work vehicle 10 may be, for example, a construction machine or the like. In this embodiment, a case where the work vehicle 10 is a rice transplanter will be explained as an example, unless otherwise specified. In this work vehicle 10, the machine body 11 travels in the work site F1 such as a field so that a planting work of seedlings in the work site F1 can be performed.

In addition, in this embodiment, as an example, it is assumed that the work vehicle 10 is an automatic machine that can be operated by automated driving (autonomous traveling and autonomous work), while a person (operator) can board the work vehicle 10. However, this is not limiting, and the work vehicle 10 may be an unmanned machine that operates by the automated driving or may operate by an operation (including a remote operation) by a person (operator).

The "work site" referred to in the present disclosure is a region in which the work vehicle 10 performs various types of work such as planting (rice planting), seeding, fertilizing, spraying of agrochemicals, leveling, harvesting or the like, while moving, and includes paddy fields, fields, orchards, pastures and the like. For example, when a paddy field or a field in which crops (agricultural products) such as rice, wheat, soybeans, buckwheat or the like are grown is the work site F1, the crops grown in the work site F1 are agricultural products. Furthermore, when garden plants are grown in a garden plant farm, the garden plant farm is the work site F1, and when trees to be used as wood are grown in a forest, as in forestry, the forest is the work site F1. In this case, the crops grown in the work site F1 are garden plants, trees or the like. In this embodiment, unless otherwise specified, a case where the work vehicle 10 is used for the seedling planting work in a field (work site F1), and the work site F1 is a paddy field for growing rice will be explained as an example. In addition, the work site F1 is not limited to a field, and if the work vehicle 10 is a construction machine, for example, a site where the construction machine performs a work is the work site F1.

In addition, the work vehicle 10 can move not only in the work site F1 (here, a field), but also on a road such as an out-of-field route outside the work site F1, for example, by automated traveling. The work vehicle 10 is configured to be capable of automated traveling (moving) along a target route (including the out-of-field route) set in advance inside the work site F1 and outside the work site F1 on the basis of position information of a current position of the work vehicle 10 measured by a positioning device 16 (see FIG. 2). The out-of-field route is, for example, an inter-field connection path that connects a plurality of work sites F1 (fields). The inter-field connection path is a farm road, a forest road, a public road, a private road, an automobile road or the like and may be a road dedicated for the work vehicle 10 or a road through which a general vehicle (a passenger car or the like) can pass.

2 Configuration of Work Vehicle

Subsequently, a configuration of the work vehicle 10 according to this embodiment will be explained in detail with reference to FIG. 1 and FIG. 2.

In this embodiment, for convenience of explanation, a vertical direction in a state where the work vehicle 10 can be used is defined as an up-down direction D1. With a direction viewed from a person (operator) onboard (an operation unit 111 of) the machine body 11 of the work vehicle 10 as a reference, a front-rear direction D2 and a left-right direction D3 (see FIG. 3) are defined. The left side of the left-right direction D3 refers to the left side in a case where the machine body 11 is caused to travel (advance) forward, and the right side of the left-right direction D3 refers to the right side in a case where the machine body 11 is caused to travel (advance) forward. However, these directions are not intended to limit a direction in which the work vehicle 10 is used (direction in use).

Figure 2:
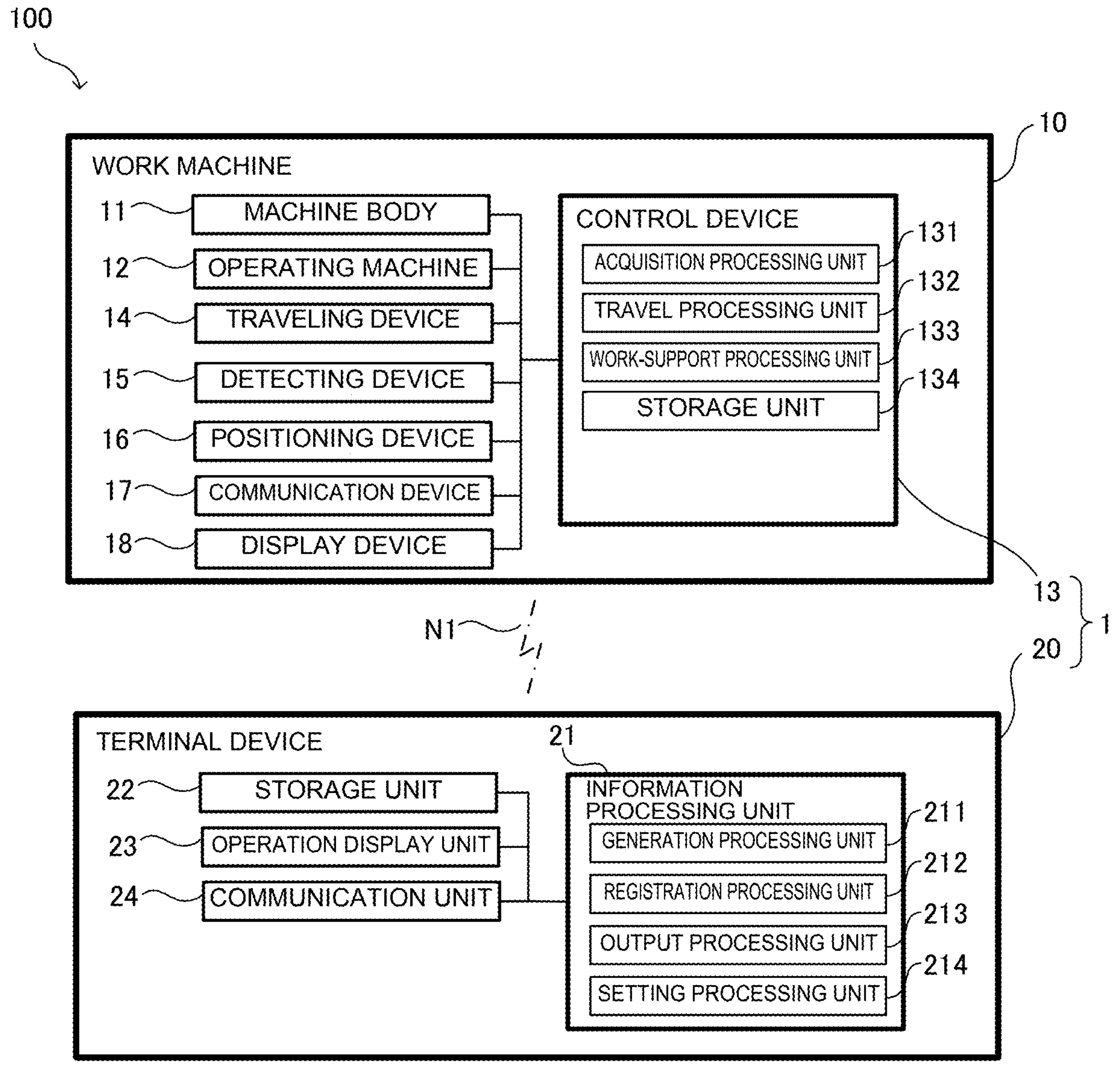
FIG. 2 is a schematic block diagram of a work system according to the embodiment 1.

As shown in FIG. 2, the work vehicle 10 includes, in addition to the machine body 11 and the operating machine 12, the control device 13, a traveling device 14, a detecting device 15, the positioning device 16, a communication device 17, a display device 18 and the like. The control device 13, the traveling device 14, the detecting device 15, the positioning device 16, the communication device 17, and the display device 18 are all mounted on the machine body 11.

The machine body 11 includes the operation unit 111 (see FIG. 1) on which a person (operator) can board.

A steering device, a transmission, an operation device and the like are disposed in the operation unit 111. The steering device, the transmission, the operation device, and the like are operation units operated by the operator or the control device 13. Therefore, the work vehicle 10 can perform both manual driving by a manual operation of the operator and automated driving by the control device 13. In addition, as described above, the operating machine 12 is connected to the rear side of the machine body 11.

In this embodiment, the operating machine 12 is connected to the rear side of the machine body 11 and can perform the planting work on a field as the work site F1, when the machine body 11 moves forward. Here, the operating machine 12 can handle the planting of a plurality of rows (as an example, six rows, seven rows, eight rows or the like) and has a work width W1 (see FIG. 4) corresponding to the number of rows to be handled in the width direction (left-right direction D3).

That is, for example, in the case of the operating machine 12 for handling the planting of seven rows, in the width direction (left-right direction D3), seven rows of seedlings can be received at the same time.

In this embodiment, as an example, it is assumed that the work vehicle 10 is a rice transplanter for eight rows, including the operating machine 12 corresponding to eight rows.

As described above, the work vehicle 10 according to this embodiment can work on a plurality of work rows aligned in a direction (left-right direction D3) intersecting the traveling direction (front-rear direction D2), while traveling in the work site F1. In this embodiment, as an example, since the work vehicle 10 is a rice transplanter for eight rows, the plurality of work rows Vr1 to Vr8 (see FIG. 4) are eight seedling rows in which seedling rows constituted by aligning a plurality of seedlings V1 (see FIG. 4) in the traveling direction (front-rear direction D2) are aligned at predetermined intervals in the left-right direction D3. In other words, the work vehicle 10 can perform the planting work in parallel (simultaneously) on the eight work rows Vr1 to Vr8. Therefore, the work vehicle 10 can simultaneously plant up to eight work rows Vr1 to Vr8 while moving forward.

As shown in FIG. 1, the traveling device 14 includes front wheels 141, rear wheels 142, a power source (an engine and/or a motor and the like), and the like. A pair of the left and right front wheels 141 and a pair of the left and right rear wheels 142 are provided respectively, for example. The traveling device 14 can cause the machine body 11 to travel (move) by the rear wheels 142 being driven by power generated by the power source. Here, the front wheel 141 functions as a steered wheel and can turn to the left-right direction D3. As a result, the machine body 11 can travel so as to move in the front-rear direction D2 and the left-right direction D3 in the work site F1.

At least during the autonomous traveling, the traveling device 14 operates in accordance with the operation by the control device 13 such as the steering device, the transmission device, and the operation device as described above. For example, in the traveling device 14, an angle of the front wheel 141 is changed by a hydraulic power-steering mechanism or the like in accordance with an operation of the steering device by the control device 13, and a traveling direction of the machine body 11 is changed. In addition, a gear of the transmission is switched to a forward gear, a reverse gear or the like in accordance with the operation of the transmission device by the control device 13, and a traveling mode of the machine body 11 is switched to forward, backward or the like. In addition, the control device 13 controls a rotational speed of the power source by operating an accelerator or a brake of the operation device, or brakes the front wheel 141 and the rear wheel 142 by using an electromagnetic brake.

Figure 4:
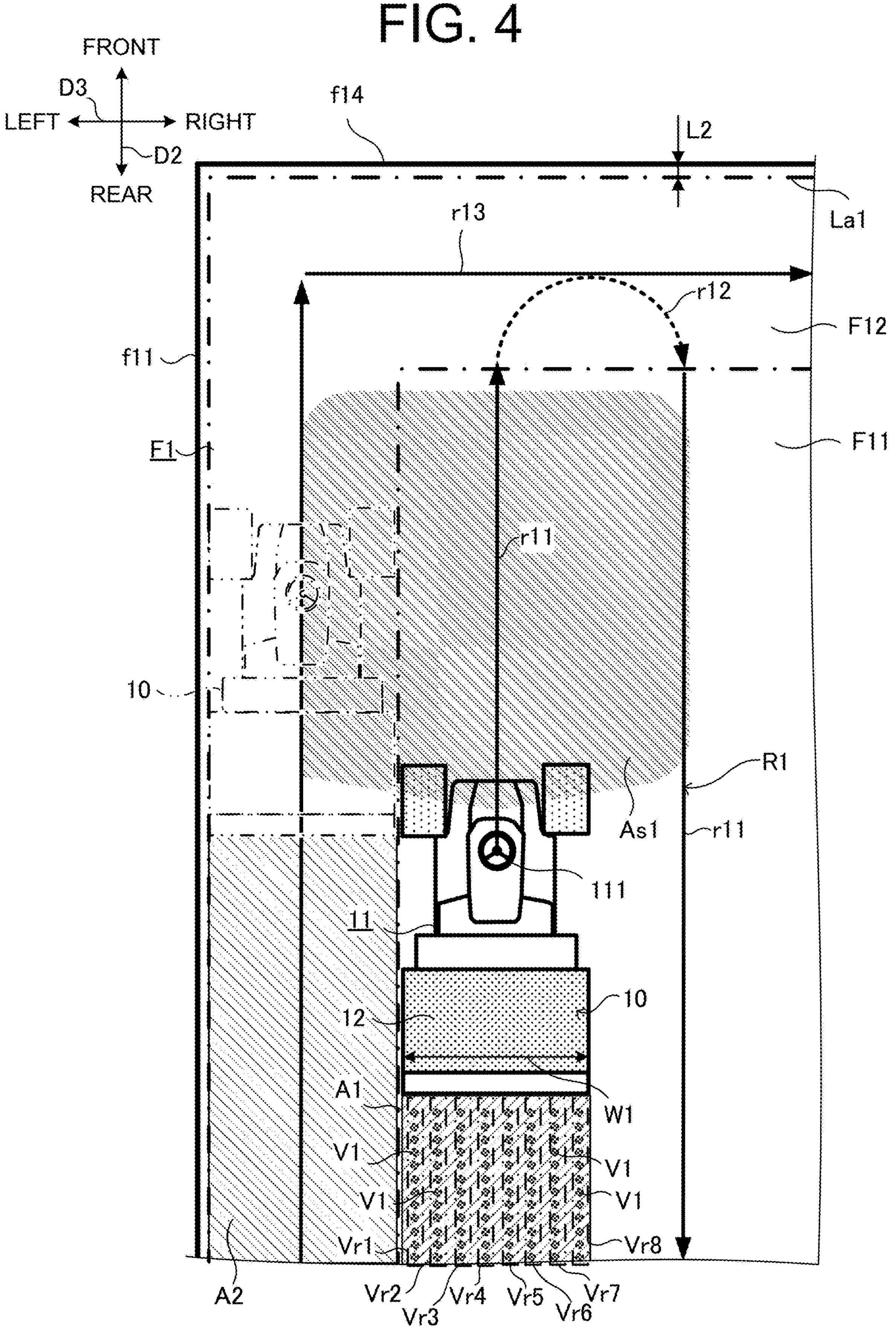
FIG. 4 is a schematic plan view illustrating an operation example of the work vehicle according to the embodiment 1.

The detecting device 15 detects a detection target (obstacle) in a detection area As1 (see FIG. 4).

In this embodiment, as an example, the detection target includes a human and other animals, a moving object such as a vehicle (including another work vehicle), a structure such as a wall and a column, a plant, a step, or other obstacles. The detecting device 15 can include various sensors such as a radar, a sonar sensor, a Light Detection and Ranging (LiDAR), a human-detecting sensor or a camera (image sensor). Here, the detecting device 15 is preferably a three-dimensional sensor capable of measuring a distance and an azimuth to a detection target by a Time Of Flight (TOF) method of measuring a distance to a distance measurement point on the basis of round-trip time until light or sound reaches the distance measurement point and returns, a stereo camera method or the like. As a result, the detecting device 15 can output measurement information including the position of the detection target in a plan view to the control device 13. In this embodiment, as an example, it is assumed that the detecting device 15 is a radar using millimeter waves (millimeter wave radar) or a sonar sensor using ultrasonic waves (or sound waves).

The positioning device 16 acquires a current position (latitude, longitude, altitude and the like) of the machine body 11. Specifically, the positioning device 16 calculates the current position (latitude and longitude) of the machine body 11 using a satellite positioning system such as Global Navigation Satellite System (GNSS). That is, the positioning device 16 has a positioning antenna for receiving a positioning signal from a satellite, and calculates the current position on the basis of the positioning signal. Furthermore, the positioning device 16 includes an inertial sensor and can also detect a posture such as a current azimuth of the machine body 11.

In addition, the positioning device 16 may detect the current position with relatively high accuracy as in Real Time Kinematic (RTK) positioning in which the current position of the work vehicle 10 is calculated using correction information corresponding to a base station (reference station) close to the work vehicle 10. The current position of the machine body 11 may be the same position as the positioning position (position of the positioning antenna) or may be a position shifted from the positioning position such as a center position of the machine body 11 in a plan view. As the positioning device 16, a mobile phone terminal, a smartphone, a tablet terminal or the like, for example, may be used instead.

The communication device 17 is a communication interface for connecting the work vehicle 10 (the control device 13, the positioning device 16 and the like) to an external device in a wired or wireless manner and performing data communication with the external device in accordance with a predetermined communication protocol. In this embodiment, the communication device 17 can communicate with at least the terminal device 20, which is an external device, via the communication network N1. Furthermore, the communication device 17 can be at least wirelessly connected to the communication network N1, and can communicate with the terminal device 20 at any time even though the work vehicle 10 is moving (traveling) in the work site F1. As the communication device 17, a mobile phone terminal, a smartphone, a tablet terminal or the like, for example, may be used instead.

The display device 18 is a user interface for presenting information to a user (operator), such as a liquid crystal display or an organic EL display for displaying various kinds of information. The display device 18 is disposed in the operation unit 111, for example, and presents various kinds of information to the operator by displaying a screen including various kinds of information. The "screen" in the present disclosure means a video (image) displayed on the display device 18 or the like and includes an icon, a figure, a photograph, a text, a moving image and the like. The screen displayed on the display device 18 includes not only a still image but also a video (moving image) that changes every moment. Furthermore, the display device 18 has a function of outputting sound (including voice) to a user (operator) and a function of receiving an operation of the user (operator).

The control device 13 has a main configuration of a computer system having one or more processors such as a Central Processing Unit (CPU) and one or more memories such as a Read Only Memory (ROM) and a Random Access Memory (RAM) and executes various kinds of processing (information processing). In this embodiment, since the control device 13 is mainly configured by a computer system having one or more processors, the control device 13 is realized by one or more processors executing the control program for a work vehicle. In this embodiment, the control device 13 is an integrated controller that executes control of the entire work vehicle 10 and is constituted by an electronic control unit (ECU: Electronic Control Unit), for example. However, the control device 13 may be provided separately from the integrated controller.

The control device 13 is configured capable of communicating with devices provided in respective parts of the machine body 11. That is, to the control device 13, the operating machine 12, the traveling device 14, the detecting device 15, the positioning device 16, the communication device 17, the display device 18 and the like are electrically connected. As a result, the control device 13 can control the operating machine 12, the traveling device 14 and the like and can acquire detection results of the detecting device 15 and the positioning device 16. Here, the control device 13 may directly transmit and receive various kinds of information (data) to and from each device or may indirectly transmit and receive various kinds of information (data) to and from each device via a repeater or the like.

In this embodiment, as shown in FIG. 2, the control device 13 includes an acquisition processing unit 131, a travel processing unit 132, a work-support processing unit 133, and a storage unit 134.

The acquisition processing unit 131 executes acquisition processing for acquiring work-site information related to the work site F1.

Here, the work-site information includes outline information based on the outline of the work site F1.

That is, the acquisition processing unit 131 acquires outline information based on the outline of the work site F1.

The travel processing unit 132 executes travel processing for controlling the traveling device 14. As an example, the travel processing unit 132 performs automated travel of the work vehicle 10 by controlling the traveling device 14 on the basis of the current position of the work vehicle 10 calculated by the positioning device 16 and a target route set in advance. Furthermore, the travel processing unit 132 performs a work (planting work in this embodiment) by the work vehicle 10 at an appropriate position on the target route by controlling the operating machine 12 on the basis of the current position of the work vehicle 10 calculated by the positioning device 16 and the target route set in advance.

Specifically, the travel processing unit 132 starts the automated travel of the work vehicle 10 when a travel start instruction is acquired from the terminal device 20. For example, when the operator operates a start button on an operation screen of the terminal device 20, the terminal device 20 outputs the travel start instruction to the work vehicle 10. As a result, for example, the work vehicle 10 starts the automated travel in accordance with a target route R1 (see FIG. 3) in the work site F1 and performs a work (planting work in this embodiment) by the operating machine 12.

The target route R1 for causing the work vehicle 10 to perform the automated travel is generated in the terminal device 20, for example. That is, the work vehicle 10 acquires route data corresponding to the target route R1 from the terminal device 20 and performs the automated travel along the target route R1.

In addition, the travel processing unit 132 stops the automated travel of the work vehicle 10 when a travel stop instruction is acquired from the terminal device 20. For example, when the operator operates a stop button on the operation screen of the terminal device 20, the terminal device 20 outputs the travel stop instruction to the work vehicle 10.

In addition, the "automated traveling" in the present disclosure includes "autonomous traveling" in which the work vehicle 10 autonomously travels without depending on an operation of an operator, and "semi-automated traveling" in which only steering is automated, for example, such as straight traveling assist.

The "autonomous traveling" is, for example, a traveling mode in which, in addition to automatic steering of the steered wheels (front wheels 141), control of the speed and the like is also automatically executed so that the work vehicle 10 travels along the target route R1. The "straight traveling assist" is, for example, a traveling mode in which only the automatic steering of the steered wheels (front wheels 141) is performed and the vehicle speed and the like are controlled by the operation of the operator so that the work vehicle 10 travels along a straight route parallel to a straight line (reference line) serving as a reference.

As another example, the work vehicle 10 may travel by manual steering by the operator. For example, the operator boards the work vehicle 10 and causes the work vehicle 10 to travel by manual steering while checking the target route R1.

The work-support processing unit 133 executes work-support processing for supporting the work (planting work in this embodiment) by the operating machine 12. The work-support processing includes, for example, processing of supporting the operation of the operating machine 12 by the operator and processing of directly controlling the operating machine 12 by performing presentation (display, sound output or the like) related to the operation of the operating machine 12 on a user interface such as the display device 18. In this embodiment, basically, the work-support processing unit 133 executes the former processing (that is, the processing of supporting the operation of the operating machine 12 by the operator) as the work-support processing.

Here, the work support processing in the work-support processing unit 133 includes processing of setting a row-stop position for executing the row-stop control of the operating machine 12. In this embodiment, the work-support processing unit 133 sets the row-stop position within the work site F1 on the basis of at least the outline information (acquired by the acquisition processing unit 131).

The "row-stop control" in the present disclosure means control in which a part of the plurality of (eight in this embodiment) work rows Vr1 to Vr8 is set to non-work, and the work is performed only for the remaining work rows Vr1 to Vr8. As an example, the operating machine 12 has a work element (planting claw or the like) that performs the work for each of the work rows Vr1 to Vr8 and a row clutch provided on a power supply path to the work element and when the row clutch of any one of the work rows Vr1 to Vr8 is disconnected, the work of the work rows Vr1 to Vr8 concerned is stopped. Therefore, for example, the row-stop control to set an arbitrary one of the work rows Vr1 to Vr8 to non-work by the operator operating a row-stop lever so as to control the row clutch of the arbitrary one of the work rows Vr1 to Vr8.

The "row-stop position" in the present disclosure is a position for executing the row-stop control as above in the work site F1. That is, the row-stop control is executed when the work vehicle 10 traveling in the work site F1 is located at the row-stop position.

The storage unit 134 is a non-volatile memory or the like that stores various kinds of data such as a control program for a work vehicle and target route information related to the target route R1. That is, the travel processing unit 132 can cause the traveling device 14 to perform automated traveling along the target route R1 on the basis of the target route information stored in the storage unit 134.

Furthermore, at least when the detecting device 15 detects an obstacle as a detection target during automated traveling of the work vehicle 10, the control device 13 performs output of a warning (including notification by sound and/or light) and executes obstacle avoidance processing (including detouring, deceleration, stopping, or the like) and the like by controlling the traveling device 14. Furthermore, the control device 13 may output the position information of the obstacle, an execution history of the avoidance processing and the like to the terminal device 20 and cause the terminal device 20 to display them or the like.

In addition to the above-described configuration, the work vehicle 10 further includes a battery, a fuel tank, various sensors and the like. The battery supplies electric power for operation to each part of the work vehicle 10 such as the control device 13, for example. In particular, the electronic devices such as the control device 13, the detecting device 15, the positioning device 16, the communication device 17, the display device 18 and the like are operated by power supply from the battery and thus, they can be operated even while the power source (engine) of the traveling device 14 is stopped.

3 Configuration of Terminal Device

Subsequently, a configuration of the terminal device 20 according to this embodiment will be explained in detail with reference to FIGS. 1 and 2.

In this embodiment, the terminal device 20 can communicate with the work vehicle 10 as described above and constitutes the control system 1 together with the control device 13 of the work vehicle 10. That is, constituent elements of the control system 1 are provided in a distributed manner at least in the work vehicle 10 and the terminal device 20. However, this configuration is not limiting, and for example, the function of the control device 13 may be provided in the terminal device 20, and in this case, the constituent elements of the control system 1 are realized only by the terminal device 20. To the contrary, for example, the function of the terminal device 20 may be provided in the control device 13, and in this case, the constituent elements of the control system 1 are realized only by the control device 13.

In this embodiment, as an example, the terminal device 20 is configured by a general-purpose terminal such as a tablet terminal, a smartphone, a laptop computer or the like. As shown in FIG. 2, the terminal device 20 includes an information processing unit 21, a storage unit 22, an operation display unit 23, and a communication unit 24. Furthermore, the terminal device 20 further includes a sound output unit that outputs sound (including voice) to a user (operator), a battery and the like.

The information processing unit 21 is configured mainly by a computer system having one or more processors such as a CPU and one or more memories such as a ROM and a RAM, and executes various kinds of processing (information processing). In this embodiment, since the information processing unit 21 is mainly configured by a computer system having one or more processors, the information processing unit 21 is realized by one or more processors executing the control program for a work vehicle. That is, each of the one or more processors of the control device 13 and one or more processors of the information processing unit 21 included in the control system 1 executes the control program for a work vehicle, whereby the control device 13 and the terminal device 20 cooperate with each other so as to embody the control system 1.

The information processing unit 21 is configured to be able to communicate with each unit (the storage unit 22, the operation display unit 23, and the communication unit 24) of the terminal device 20. That is, the storage unit 22, the operation display unit 23, the communication unit 24 and the like are electrically connected to the information processing unit 21. As a result, the information processing unit 21 can read and write information from and to the storage unit 22, control display of the operation display unit 23, and acquire an operation input to the operation display unit 23. Here, the information processing unit 21 may directly transmit and receive various kinds of information (data) to and from each unit or may indirectly perform the above via a repeater or the like.

The terminal device 20 as above is a user interface for receiving an operation input by a user (operator) and outputting various kinds of information to the user. For example, the terminal device 20 outputs an electrical signal corresponding to a user's operation on the operation display unit 23, thereby receiving various operations by the user. Furthermore, the terminal device 20 outputs various kinds of information to the user by displaying various screens on the operation display unit 23.

The storage unit 22 is a non-volatile memory or the like that stores various kinds of data such as the control program for a work vehicle, target route information related to the target route R1 and the like. Furthermore, the storage unit 22 can store various kinds of data such as operating machine information, work vehicle information, field information, work information and the like. The operating machine information is information related to the operating machine 12 mounted on the machine body 11 and includes, for example, information such as the type, identification information, a model name, a model, a size (dimensions) and the like of the operating machine 12. The work vehicle information is information related to the machine body 11 (vehicle main body) of the work vehicle 10 and includes, for example, information such as the type (for example, half crawler type/wheel type and the like), identification information, a model name, a model, a size (dimensions) and the like of the machine body 11. The field information is information related to the field set as the work site F1 and includes information such as identification information, a field name, a position, a shape, a size, a work start position (travel start position) at which a work is started, a work end position (travel end position) at which a work is ended, a work direction and the like of the field. The work information is information related to the work performed by the work vehicle 10 and includes, for example, information such as the type of the work, how the work is to be performed specifically and the like. Furthermore, the work information may further include presence or absence of a cooperative work by the work vehicle 10, a width of a headland, a width of the non-cultivated land and the like.

These pieces of information (the target route information, the operating machine information, the work vehicle information, the field information, the work information and the like) stored in the storage unit 22 are set (registered) by an operation input to the operation display unit 23 by the user (operator) or by acquisition from the work vehicle 10. For example, the type of the operating machine 12 in the operating machine information may be specified by the user operating the operation display unit 23, or the work vehicle 10 may automatically identify the operating machine 12 mounted on the machine body 11 and transmit it to the terminal device 20. These pieces of information may be acquired by the terminal device 20 from an external device (for example, a server, an external storage medium, another terminal device or the like) other than the work vehicle 10.

The operation display unit 23 is a user interface including a display unit such as a liquid crystal display or an organic EL display that displays various kinds of information and an operation unit such as a touch panel, a mouse, a keyboard, a mechanical switch or an encoder that receives an operation. The operator can perform an operation to set (register) the various kinds of information on an operation screen displayed on the display unit of the operation display unit 23 by operating the operation unit of the operation display unit 23. For example, the operator can set automated travel information (including target route information) related to the automated traveling of the work vehicle 10.

In addition, the operation display unit 23 displays a progress state of the work at the work site F1, the target route R1 of the work vehicle 10, and the operating state of the work vehicle 10 including an (actual) movement trajectory, a current position, a moving speed and the like, thereby enabling remote monitoring by the operator of the work vehicle 10 during automated driving. Here, the operating state of the work vehicle 10 also includes a detection result of the detection target or the like in the detecting device 15. Furthermore, the operation display unit 23 can receive a travel start instruction or a travel stop instruction and the like of the work vehicle 10 from the operator. The terminal device 20 can remotely control the work vehicle 10 by transmitting the travel start instruction or the travel stop instruction and the like to the work vehicle 10. Therefore, the remote operation of the work vehicle 10 by the operator is made possible.

The communication unit 24 is a communication interface for connecting the terminal device 20 to the work vehicle 10 in a wired or wireless manner and for performing data communication with the work vehicle 10 in accordance with a predetermined communication protocol. In this embodiment, the communication unit 24 can communicate at least with the (communication device 17 of) work vehicle 10 via the communication network N1. Furthermore, since the communication unit 24 is capable of connection to the communication network N1 at least wirelessly, it can communicate with the work vehicle 10 at any time even from a place sufficiently far from the work vehicle 10.

In this embodiment, as shown in FIG. 2, the information processing unit 21 includes a generation processing unit 211, a registration processing unit 212, an output processing unit 213, and a setting processing unit 214. In this embodiment, as an example, since the information processing unit 21 is mainly configured by a computer system having one or more processors, when the one or more processors execute the control program for a work vehicle, these plural functional units (the generation processing unit 211 and the like) are realized. The plurality of functional units included in the information processing unit 21 may be provided in a plurality of housings in a distributed manner or may be provided in one housing.

The generation processing unit 211 executes route generation processing of generating a route (target route R1) for the work vehicle 10 to travel (automated traveling) in the work site F1. Here, the generation processing unit 211 generates the target route R1 on the basis of data for generation, including the operating machine information, the work vehicle information, the field information, the work information and the like stored in the storage unit 22. That is, regarding the target route R1, the generation processing unit 211 generates the target route on the basis of the operating machine information, the work vehicle information, the field information, the work information and the like set (registered) by an operation input or the like by the user (operator) to the operation display unit 23, for example.

Specifically, the generation processing unit 211 generates the target route R1 in the work site F1 on the basis of the travel start position P1 (see FIG. 3) and the travel end position P2 (see FIG. 3) included in the field information. For example, the generation processing unit 211 generates the target route R1 for moving the machine body 11 of the work vehicle 10 from the travel start position P1 to the travel end position P2 in the work site F1 on the basis of the data for generation.

In this embodiment, the field information included in the data for generation includes outline information based on the outline of the work site F1. Furthermore, the outline information includes information related to an allowable limit line La1 (see FIG. 4). The "allowable limit line" referred to in this disclosure is a virtual line defined by a margin value L2 (see FIG. 4), which is a distance to an inner side of the work site F1 with an outline of the work site F1 as a reference and is a limit position at which the work vehicle 10 is allowed to protrude. Therefore, the generation processing unit 211 can generate a route (target route R1) for the work vehicle 10 to travel on the basis of at least the allowable limit line La1.

The registration processing unit 212 executes registration processing of registering the operating machine information, the work vehicle information, the field information, the work information and the like. That is, the operating machine information, the work vehicle information, the field information, the work information and the like used to generate the target route R1 are registered (set) by the registration processing unit 212 through an operation input or the like by the user (operator) to the operation display unit 23, for example.

The output processing unit 213 executes output processing of outputting the route data of the target route R1 to the work vehicle 10, for example. That is, the route data related to the target route R1 generated by the generation processing unit 211 is output from the output processing unit 213 to the communication unit 24, for example, and is transmitted from the communication unit 24 to the work vehicle 10.

For example, when a work is to be started, the operator performs selection of a field (work site F1), selection of a work, confirmation of the target route R1 and the like and gives a work start instruction. When the operator gives the work start instruction, the output processing unit 213 transmits (outputs) the route data of the target route R1 generated by the generation processing unit 211 to the work vehicle 10. When the work vehicle 10 receives the route data generated by the terminal device 20, it stores the route data in the storage unit 134. Then, the work vehicle 10 performs automated driving (autonomous traveling and autonomous work) on the basis of the current position of the work vehicle 10 calculated by the positioning device 16 and the target route R1 specified by the route data.

Furthermore, the output processing unit 213 can cause the generated target route R1 to be displayed on the operation display unit 23 by outputting it to the operation display unit 23. The output mode of the output processing unit 213 is not limited to the transmission to the work vehicle 10 or the display as described above and may be transmission to another device (such as a user terminal), printing (printout), writing to a non-transitory recording medium, sound output or the like, for example.

The setting processing unit 214 executes setting processing of setting a position of the allowable limit line La1. That is, in this embodiment, the generation processing unit 211 can generate a route (target route R1) for the work vehicle 10 to travel on the basis of the allowable limit line La1 whose position is set by the setting processing unit 214. In this embodiment, the position of the allowable limit line La1 is set by the setting processing unit 214 in accordance with the operation of the operator on the operation display unit 23.

The terminal device 20 may be capable of accessing a website (agricultural support site) of an agricultural support service provided by a server via the communication network N1. In this case, the terminal device 20 can function as an operation terminal for the server by the information processing unit 21 executing a browser program. And the server includes each of the above-described processing units and executes each processing.

4 Control Method of Work Vehicle

Hereinafter, an example of a control method of the work vehicle 10 (hereinafter, simply referred to as a "control method") executed mainly by the control system 1 (the control device 13 and the terminal device 20) will be explained with reference to FIGS. 3 to 12.

Since the control method according to this embodiment is executed by the control system 1 mainly configured by a computer system, or in other words, the control method is embodied by a control program for a work vehicle (hereinafter, simply referred to as a "control program"). That is, the control program according to this embodiment is a computer program that causes one or more processors to execute each processing according to the control method.

Here, in a case where a specific start operation set in advance for causing the control program to be executed is performed, the control system 1 executes the following various kinds of processing according to the control method. A start operation is, for example, an activation operation of an application program (control program for a work vehicle) in the terminal device 20 or the like. On the other hand, in a case where a specific end operation set in advance is performed, the control system 1 ends the following various kinds of processing according to the control method. The end operation is, for example, an end operation of the application program (control program for a work vehicle) in the terminal device 20 or the like.

In addition, in the following, it is assumed that the work site F1 is a rectangular field in a plan view as shown in FIG. 3, and in the outlines (outer peripheral edges) of the work site F1, one short side is a "first outline f11", the other short side as a "second outline f12", one long side as a "third outline f13", and the other long side as a "fourth outline f14" as a "fourth outline f14", respectively. And in the work site F1, it is assumed that the travel start position P1 is disposed close to a corner part between the first outline f11 and the third outline f13, and the travel end position P2 is disposed close to a corner part between the second outline f12 and the third outline f13.

4.1 Basic Operation

First, in the control system 1 according to this embodiment, a basic operation in a case where the work vehicle 10 is caused to perform automated traveling along the target route R1 in the work site F1 constituted by a field will be explained with reference to FIG. 3 and FIG. 4. FIG. 4 is a schematic enlarged view of the vicinity of the corner part between the first outline f11 and the fourth outline f14 in FIG. 3.

In the examples of FIG. 3 and FIG. 4, the target route R1 includes a work route r11, a non-work route r12, and an outer-peripheral work route r13. The work route r11 and the outer-peripheral work route r13 are routes on which the work vehicle 10 travels (moves) while performing a work with the operating machine 12. The non-work route r12 is a route that connects a plurality of the work routes r11 and causes the work vehicle 10 to perform turning to change the traveling direction, and is a route for the work vehicle 10 to travel (move) without performing a work at the operating machine 12.

In the drawing representing the target route R1 such as FIG. 3, the route on which the work vehicle 10 performs a work (the work route r11 and the outer-peripheral work route r13) is indicated by a solid line, and the route on which the work vehicle 10 does not perform a work (the non-work route r12) by a dotted line. The drawing representing the target route R1, such as FIG. 3, schematically represents the target route R1 (and the work vehicle 10) generated for the work site F1 in a plan view. In FIG. 3 and FIG. 4, the front-rear direction D2 and the left-right direction D3 are directions with the orientation of the machine body 11 of the work vehicle 10 shown in FIGS. 3 and 4 as a reference.

More specifically, as shown in FIG. 3, the target route R1 includes a plurality of work routes r11 extending between a pair of the long sides (the third outline f13 and the fourth outline f14) of the work site F1. That is, in the target route R1 exemplified in FIG. 3, the work route r11 extending upward in the drawing is disposed from the travel start position P1 set at the lower left corner in the drawing, and furthermore, a plurality of work routes r11 along (parallel to) the work route r11 are disposed at regular intervals on the right in the drawing. The plurality of work routes r11 are disposed such that the work route r11 extending from one long side (third outline f13) side of the work site F1 toward the other long side (fourth outline f14) side and the work route r11 extending in the opposite direction are alternately aligned.

Here, each of the plurality of work routes r11 is a linear route along which the work vehicle 10 moves forward while performing a work with the operating machine 12. An interval between the adjacent work routes r11 is set on the basis of the width dimension in the left-right direction D3 of the operating machine 12 (work width W1), and the planting work is performed on substantially the whole area of the work site F1 (excluding a headland region that is the outer peripheral part) by the work vehicle 10 traveling along the plurality of work routes r11. And a pair of adjacent work routes r11 are connected to each other by the non-work route r12 that connects a terminal end of one work route r11 on the first outline f11 side and a start end of another work route r11 on the second outline f12 side.

In addition, the outer-peripheral work route r13 is a route which continues to the terminal end of the final work route r11 (on the second outline f12 side) among the plurality of work routes r11 and goes around the outer peripheral part of the work site F1 along the outline (first to fourth outlines f11 to f14) of the work site F1. In the example of FIG. 3, the outer-peripheral work route r13 extends from the lower right corner part in the drawing to the lower left corner part in the drawing, from the lower left corner part in the drawing to the upper left corner part in the drawing, from the upper left corner part in the drawing to the upper right corner part in the drawing, and from the upper right corner part in the drawing to the travel end position P2 at the lower right corner part in the drawing, thereby going around the headland region, which is the outer peripheral part of the work site F1.

According to the target route R1 as above, the work vehicle 10 performs the planting work while reciprocatingly traveling in parallel on the work route r11 from the travel start position P1 in an inner side region F11 (inside a one-dot chain line in FIG. 3) excluding an outer peripheral region F12, which is an outer peripheral part of the work site F1. Thereafter, the work vehicle 10 performs the planting work in the outer peripheral region F12 while traveling clockwise around the outer-peripheral work route r13 toward the travel end position P2. However, when the work vehicle 10 travels on the outer-peripheral work route r13, it is preferable that the automated travel of the work vehicle 10 is performed in a "manned state" in which an operator boards the machine body 11. As a result, the work vehicle 10 can perform various kinds of planting works for substantially the whole area of the work site F1 including the outer peripheral region F12.

In short, since the work vehicle 10 performs the work (planting work) by the operating machine 12 when traveling on the work route r11, as shown in FIG. 4, a plurality of seedlings V1 are planted in a passing region A1 of the inner side region F11 through which (the operating machine 12 of) the work vehicle 10 has passed. Here, in the passing region A1, a plurality of (eight) work rows Vr1 to Vr8 (seedling rows) aligned in the left-right direction D3 orthogonal to the traveling direction of the work vehicle 10 are formed.

Similarly, when the work vehicle 10 travels along the outer-peripheral work route r13, too, the operating machine 12 performs the work (planting work) and thus, a plurality of the seedlings V1 are planted also in a passing region A2 of the outer peripheral region F12 through which the work vehicle 10 (indicated by an imaginary line (two-dot chain line) in FIG. 4) has passed. Here, though not shown in FIG. 4, the plurality of (eight) work rows Vr1 to Vr8 (seedling rows) aligned in the left-right direction D3 orthogonal to the traveling direction of the work vehicle 10 are formed in the passing region A2.

The target route R1 is not limited to the route exemplified in FIG. 3 and is set as appropriate. In addition, though the work vehicle 10 initially travels in the inner side region F11 and then, travels in the outer peripheral region F12 in FIG. 3, a traveling order of the work vehicle 10 is not limited to this. For example, the work vehicle 10 may initially travel in the outer peripheral region F12 and then, may travel in the inner side region F11.

In addition, in the example of FIG. 3, the non-work route r12 set in the outer peripheral region F12 includes a turning route for a right turn in gentle turning, but the turning mode for changing an azimuth of the work vehicle 10 is not limited to the "gentle turn". The non-work route r12 may include, for example, a turning mode in which the machine body 11 is turned while switching between forward movement and backward movement in order to enable the machine body 11 to turn in a limited space, such as a so-called "fishtail".

Similarly, an appropriate turning mode such as the "gentle turn" or the "fishtail turn" can be applied also to the turning mode of the work vehicle 10 when traveling on the outer-peripheral work route r13.

In order to realize the above-described automated traveling of the work vehicle 10, it is necessary to recognize and register the shape of the work site F1 in advance. As an example, the operator boards the work vehicle 10 and drives it so as to make a round along the outer periphery of the work site F1 to be registered (teaching travel), and the terminal device 20 acquires position information during the travel from the work vehicle 10, recognizes the position and the shape of the work site F1 on the basis of the position information, and registers it as the work site F1. The outer-peripheral work route r13 is generated on the route on which the work vehicle 10 travels in the teaching travel as above. When the work site F1 is registered on the basis of the teaching travel as above or achievement information of the travel route in the past, it is possible to generate the target route R1 in a state where an obstacle which is difficult to be detected only by the detecting device 15 such as an underdrain is avoided from the beginning, for example.

Furthermore, a plurality of work routes r11 may be generated by leaving a width for a plurality of strokes in the outer peripheral region F12 of the work site F1, and the outer-peripheral work routes r13 for the plurality of strokes may be generated along the outer periphery of the work site F1. In this case, the work vehicle 10 travels for a work along the plurality of work routes r11 and then, sequentially travels along a plurality of rounds of the outer-peripheral work routes r13 from the inner side toward the outer side. At this time, it is preferable that the work vehicle 10 travels in an automated manner in an unmanned state on the outer-peripheral work route r13 on the inner side and travels in the automated manner in a manned state on the outermost outer-peripheral work route r13.

4.2 Row-Stop Control

Subsequently, processing related to the row-stop control will be explained with reference to FIG. 5 to FIG. 11.

Figure 6:
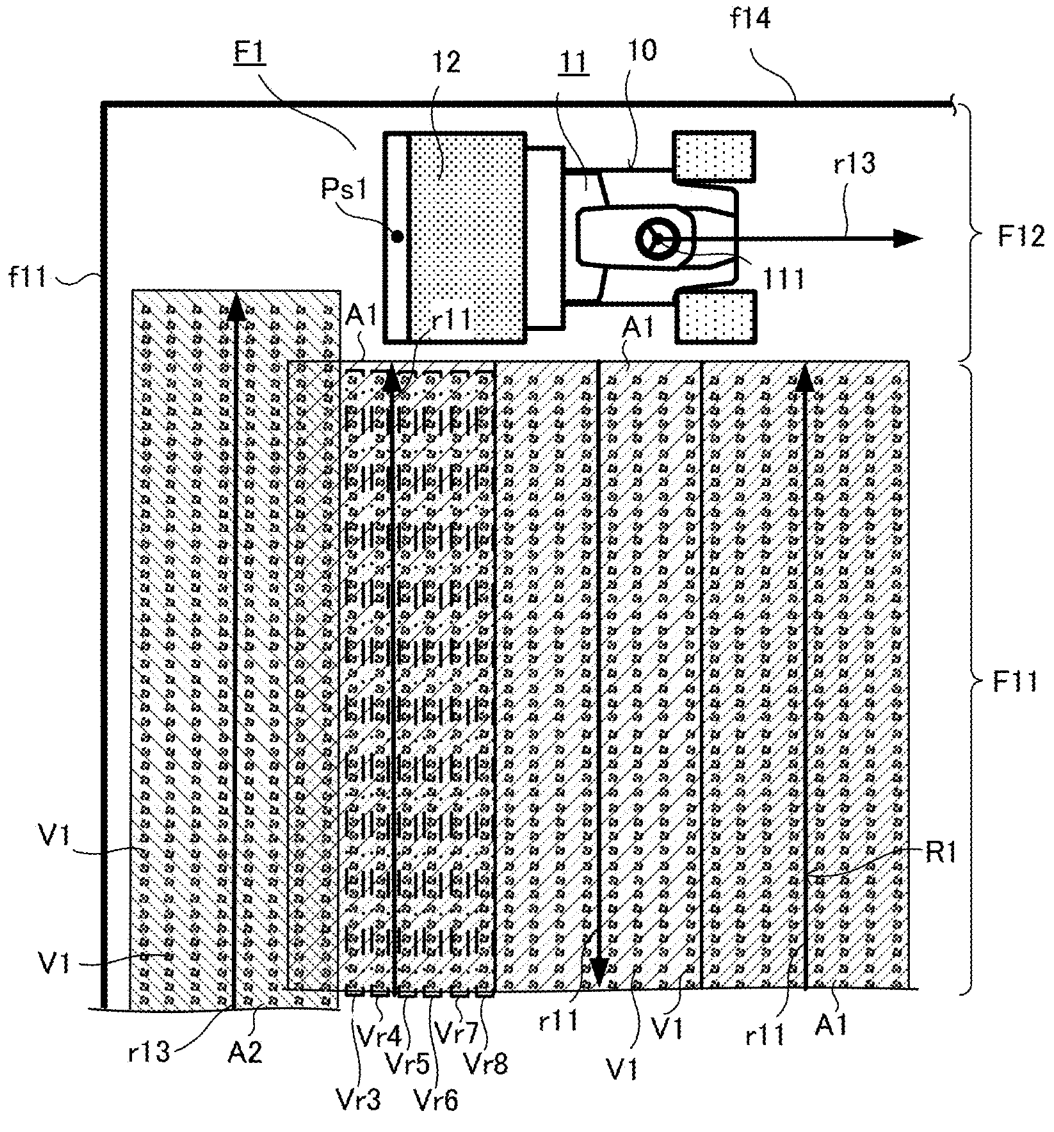
FIG. 6 is a schematic plan view illustrating an operation example of row-stop control of the work vehicle according to the embodiment 1.

That is, the control system 1 according to this embodiment has a function of the "row-stop control" in which a part of the plurality of (eight in this embodiment) work rows Vr1 to Vr8 is set to non-work, and for example, as shown in FIG. 6, the row-stop control is executed when necessary.

Figure 5:
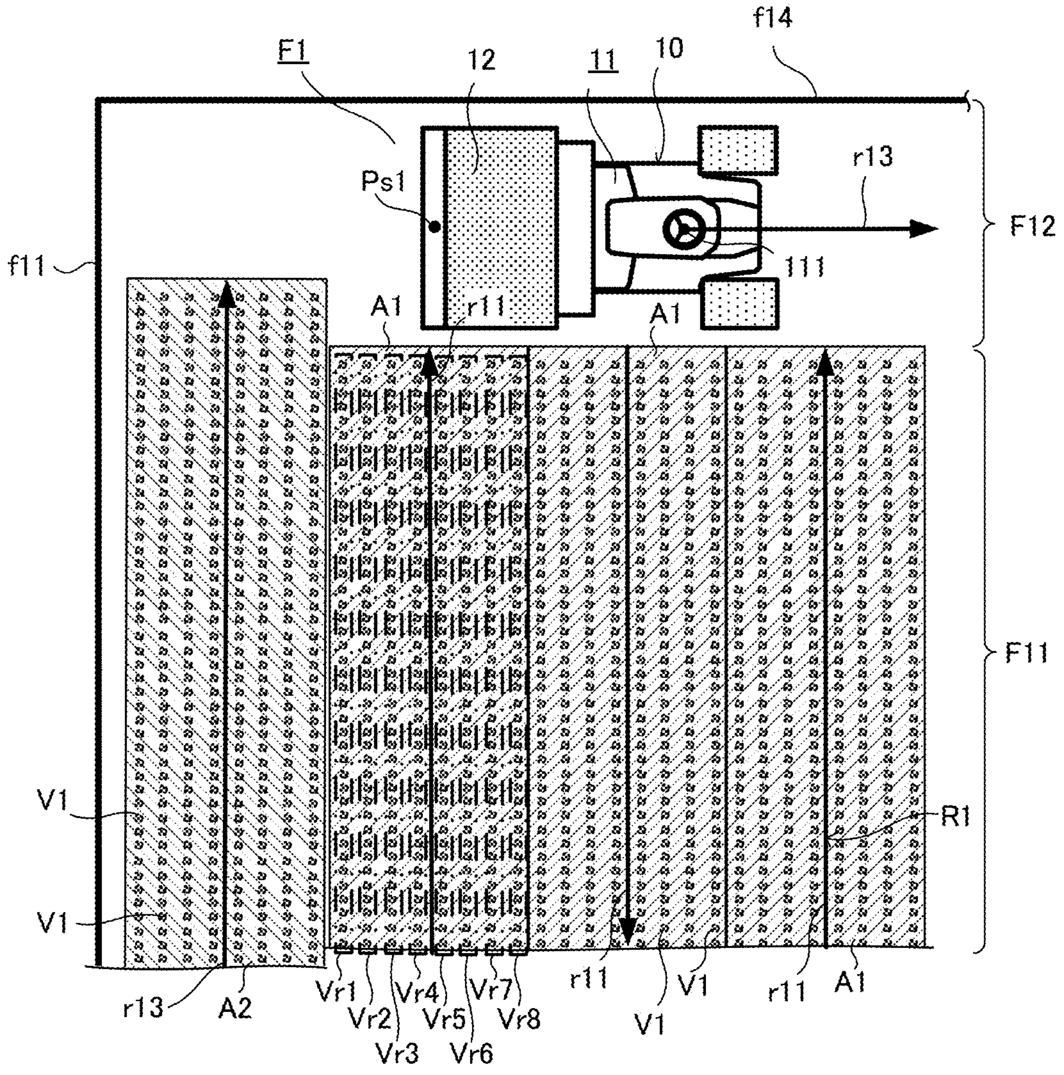
FIG. 5 is a schematic plan view illustrating an operation example of the work vehicle according to the embodiment 1.

In the example shown in FIG. 5, the passing region A1 through which the operating machine 12 passes when the work vehicle 10 travels on the work route r11 does not overlap with the passing region A2 through which the operating machine 12 passes when the work vehicle 10 travels on the outer-peripheral work route r13. Therefore, in the example of FIG. 5, the work vehicle 10 performs "all-row work" in which the work is performed on all of the plurality of work rows Vr1 to Vr8 both when traveling on the work route r11 and when traveling on the outer-peripheral work route r13.

On the other hand, in the example shown in FIG. 6, the passing region A1 through which the operating machine 12 passes when the work vehicle 10 travels on the work route r11 and the passing region A2 through which the operating machine 12 passes when the work vehicle 10 travels on the outer-peripheral work route r13 partially overlap with each other. Specifically, the passing region A1 when traveling on the work route r11 located closest to the first outline f11 side (left side in FIG. 6) among the plurality of work routes r11 and the passing region A2 when traveling on the outer-peripheral work route r13 partially overlap with each other. Therefore, in the example of FIG. 6, the work vehicle 10 executes "row-stop control" when traveling on the work route r11 located closest to the first outline f11 side so that the all-row work can be performed while traveling on the outer-peripheral work route r13.

That is, in the example of FIG. 6, when traveling on the work route r11 closest to the first outline f11 side, the row-stop control is executed such that the work rows Vr1, Vr2 overlapping with the passing region A2 among the plurality of work rows Vr1 to Vr8 are set to non-work, and only the remaining work rows Vr3 to Vr8 are set to work.

As a result, since the work (planting work) is not performed in the overlapping region between the passing region A1 and the passing region A2 during the traveling on the work route r11, it is possible to perform the all-row work during traveling on the outer-peripheral work route r13 while avoiding the overlapping work.

By the way, when the row-stop control as above is to be executed, it is possible for an operator to visually determine at which position in the work site F1 the row-stop control is to be executed, but the determination is not easy, and appropriate row-stop control may not be executed depending on a skill level of the operator or the like. That is, in the example of FIG. 6, even if the row-stop control is to be executed so that the work rows Vr1, Vr2 among the plurality of work rows Vr1 to Vr8 are set to non-work when traveling on the work route r11 closest to the first outline f11 side, it is not easy for the operator to visually determine the necessity of the row-stop control when traveling on the work route r11. As a result, there is a possibility that an appropriate position for executing the row-stop control is not specified, and work efficiency with respect to the whole area of the work site F1 lowers.

Thus, in the control method according to this embodiment, improvement of the work efficiency for the whole area of the work site F1 is made possible by the following configuration.

That is, the control method according to this embodiment is a control method of the work vehicle 10, capable of working on the plurality of work rows Vr1 to Vr8 aligned in a direction intersecting the traveling direction, while traveling in the work site F1. This control method includes acquisition of the outline information based on the outline of the work site F1 and setting of the row-stop position for executing the row-stop control in the work site F1 on the basis of the outline information. The "row-stop control" referred to here is control in which a part of the plurality of work rows Vr1 to Vr8 is set to non-work.

The "outline information" referred to in this disclosure is information based on the outline of the work site F1 and includes, for example, the outline of the work site F1 (first to fourth outlines f11 to f14) itself, the allowable limit line La1, or the outer-peripheral work route r13 that avoids an obstacle located on the outer peripheral part of the work site F1 or the like.

The outline information may be included in the field information or may be generated at the time of teaching travel, for example. In this embodiment, as an example, the row-stop position is assumed to be set on the basis of the outline of the work site F1 (first to fourth outlines f11 to f14).

In the example of FIG. 6, the position on the work route r11 located closest to the first outline f11 side (left side in FIG. 6) among the plurality of work routes r11 is set to a row-stop position where the row-stop control should be executed. As a result, when traveling on the work route r11 closest to the first outline f11 side, the work vehicle 10 can execute the row-stop control in which the work rows Vr1, Vr2 among the plurality of work rows Vr1 to Vr8 are set to non-work.

In short, according to the control method according to this embodiment, since the row-stop position for executing the row-stop control is set in the work site F1 on the basis of the outline information, an appropriate position for executing the row-stop control is specified. Therefore, for example, the row-stop control is executed regardless of the skill level of the operator or the like, and it is possible to improve the work efficiency of the whole area of the work site F1.

When the row-stop position is set, the work-support processing unit 133 presents the row-stop position to the operator by causing the display device 18 to display it, for example. Specifically, a map screen of the work site F1 including the target route R1 is displayed on the display device 18 during the traveling of the work vehicle 10 so as to display the set row-stop position on the map screen. As a result, the operator can execute the row-stop control by operating the row-stop lever at the timing when the work vehicle 10 travels on the target route R1 and reaches the row-stop position on the target route R1.

Furthermore, in addition to or in place of the display of the map screen described above, the work-support processing unit 133 may perform a notification for prompting the row-stop control to the reference point 18 or the like when the work vehicle 10 traveling along the target route R1 reaches a predetermined distance front before the row-stop position. In any case, since the row-stop control can be executed at appropriate timing, it is possible to improve the work efficiency for the whole area of the work site F1.

Figure 7:
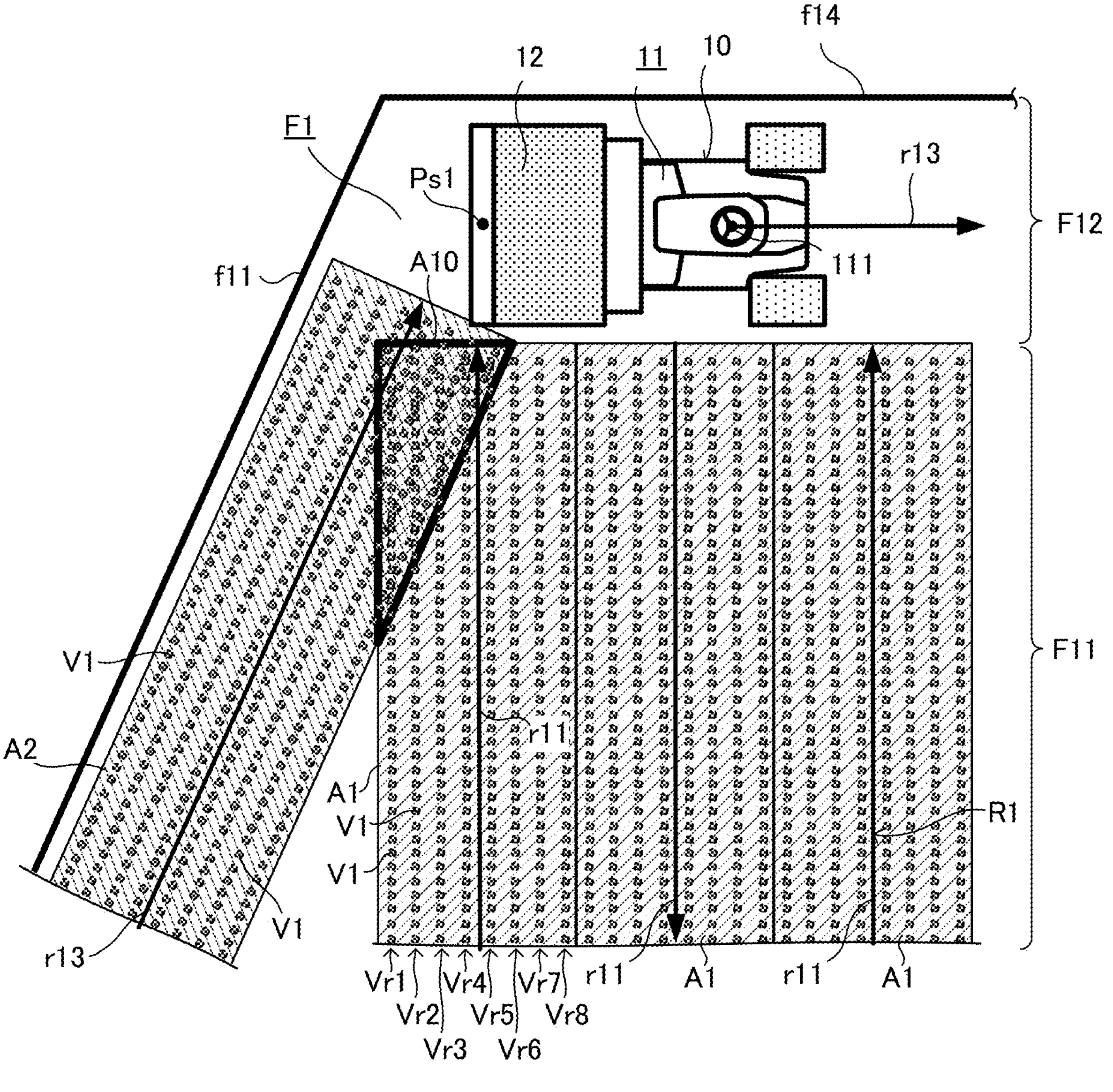
FIG. 7 is a schematic plan view illustrating an operation example of the row-stop control of the work vehicle according to the embodiment 1.

In addition, as exemplified in FIG. 7, when at least one of the first to fourth outlines f11 to f14 as the outline of the work site F1 is inclined with respect to the work route r11, only a part on the same work route r11 is set as the row-stop position. That is, in the example of FIG. 7, the passing region A1 at the time of traveling on the work route r11 located closest to the first outline f11 side (left side in FIG. 7) among the plurality of work routes r11 and the passing region A2 at the time of traveling on the outer-peripheral work route r13 overlap with each other only in a triangular overlapping region A10. Therefore, in the example of FIG. 7, the work vehicle 10 executes the "row-stop control" when traveling on a part on the terminal end side of the work route r11 located closest to the first outline f11 side.

Figure 8:
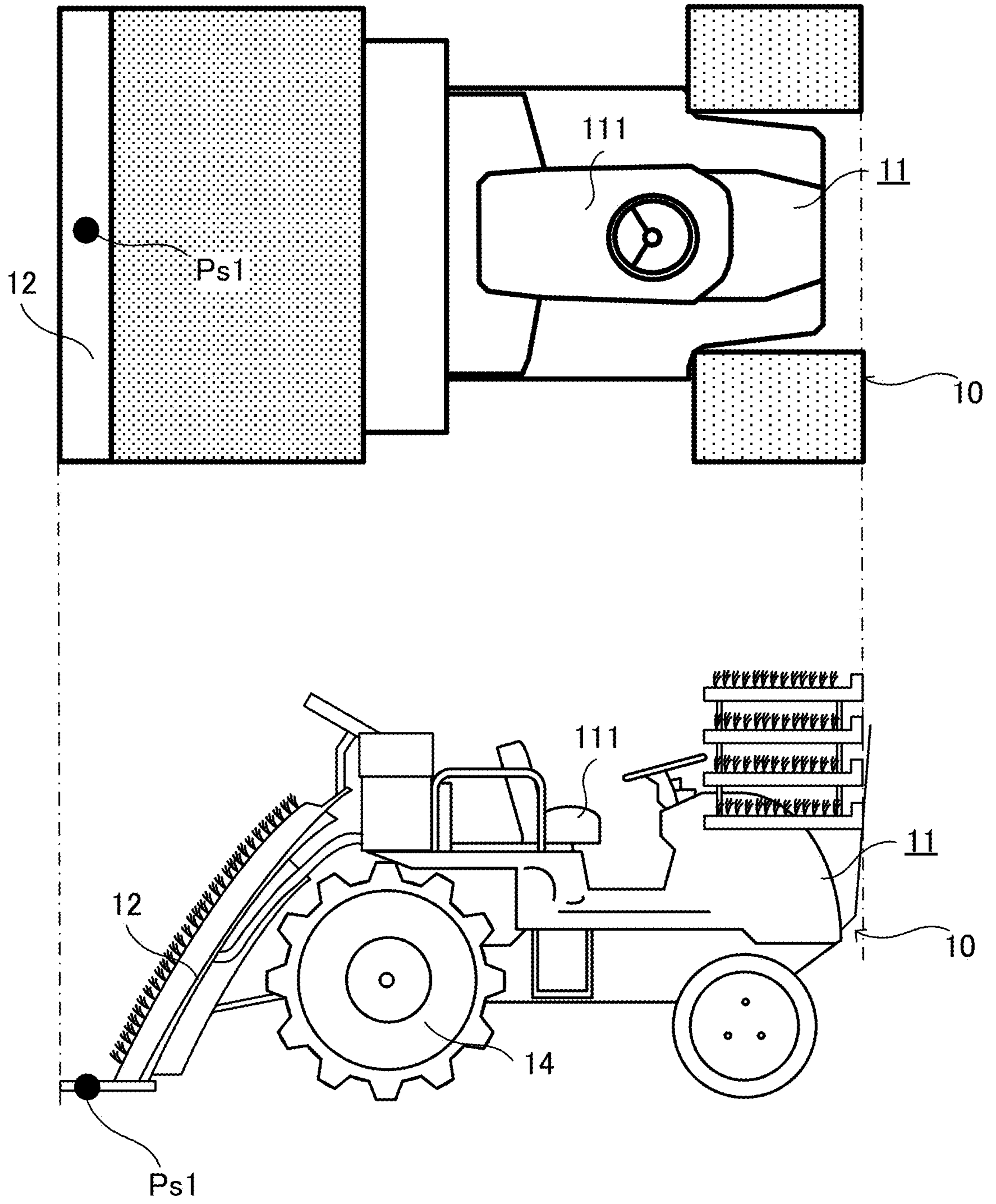
FIG. 8 is a schematic plan view and a schematic right-side view illustrating a reference point in the work vehicle according to the embodiment 1.
Figure 9:
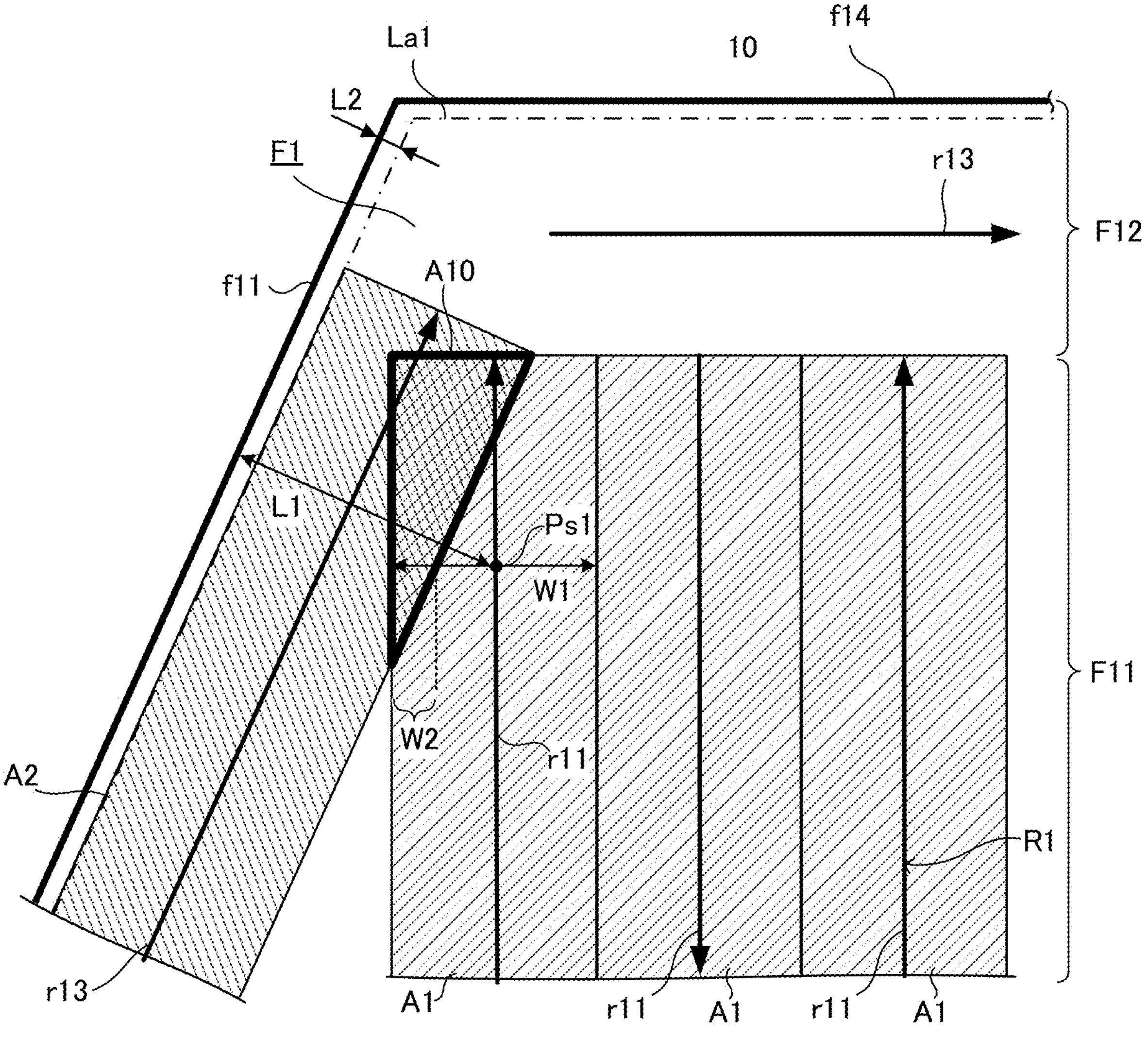
FIG. 9 is a schematic plan view illustrating an operation example of the row-stop control of the work vehicle according to the embodiment 1.

Specifically, as an example in this embodiment, as shown in FIG. 8, a reference point Ps1 is set at a center part in the left-right direction D3 on the rear end part of the operating machine 12. As shown in FIG. 9, the position of the work vehicle 10 when the overlapping region A10 is present on the straight line of a work width W1 passing through the reference point Ps1 and orthogonal to the target route R1 is set as the row-stop position. That is, when the work vehicle 10 is located at the row-stop position as above, the work (planting work) to the overlapping region A10 is performed by the operating machine 12 and thus, the row-stop control is executed in this case.

As a result, in the example of FIG. 7, at the terminal end of the work route r11 closest to the first outline f11 side, the row-stop control is executed such that, among the plurality of work rows Vr1 to Vr8, the work rows Vr1 to Vr5 overlapping the passing region A2 are set to non-work, and only the remaining work rows Vr6 to Vr8 perform the work. Accordingly, since the work (planting work) is not performed in an overlapping region A10 between the passing region A1 and the passing region A2 during the traveling on the work route r11, it is possible to perform the all-row work during traveling on the outer-peripheral work route r13 while avoiding the overlapping work.

In other words, if the overlapping region A10 between the inner side region F11 and the outer peripheral region F12 can be specified, it is only necessary to execute the row-stop control so that the overlapping region A10 is set to non-work. That is, the control method according to this embodiment includes acquiring of outline information based on the outline of the work site F1 and, on the basis of the outline information, obtaining of the overlapping region A10 between the passing region of the work vehicle 10 reciprocatingly traveling in the inner side region F11 and the passing region A2 of the work vehicle traveling around in the outer peripheral region F12.

According to this configuration, in the same manner as above, the overlapping region A10 in which the row-stop control should be executed is specified on the basis of the outline information and thus, an appropriate position for executing the row-stop control is specified. Therefore, for example, the appropriate row-stop control is executed regardless of the skill level of the operator or the like, and it is possible to improve the work efficiency of the whole area of the work site F1.

In addition, the control method according to this embodiment further includes, when the row-stop position is to be set, specifying of the row-stop width W2 corresponding to the number of the work rows Vr1 to Vr8 which should be set to non-work among the plurality of the work rows Vr1 to Vr8 at the row-stop position. That is, the work-support processing unit 133 specifies the row-stop width W2 at the respective row-stop positions in conjunction with the setting of the row-stop positions. Specifically, an overlap width with the overlapping region A10 on the straight line of the work width W1 passing through the reference point Ps1 and orthogonal to the target route R1 is specified as the row-stop width W2. As a result, in the row-stop control, it is possible to present to the operator which of the work rows Vr1 to Vr8 among the plurality of work rows Vr1 to Vr8 should be set to non-work, together with the row-stop position.

In particular, as in the examples shown in FIGS. 7 and 9, in a case where at least one of the first to fourth outlines f11 to f14 as the outline of the work site F1 is inclined with respect to the work route r11, even when the work vehicle 10 is traveling on the same work route r11, the row-stop width W2 continuously changes. As described above, by presenting the continuously changing row-stop width W2 to the operator in real time, the operator can perform the row-stop control with the appropriate row-stop width W2 at each row-stop position.

More specifically, in this embodiment, the work-support processing unit 133 sets the row-stop position on the basis of a distance L1 (see FIG. 9) from a specific line included in the outline information to the reference point Ps1 set with respect to the work vehicle 10. The "specific line" referred to here is the outline of the work site F1 (first to fourth outlines f11 to f14), the allowable limit line La1, the outer-peripheral work route r13 that is located on the outer peripheral part of the work site F1 and avoids an obstacle or the like. In this embodiment, the specific line is the outline (first to fourth outlines f11 to f14) of the work site F1.

Therefore, the work-support processing unit 133 sets the row-stop position on the basis of the distance L1 from the outline (first to fourth outlines f11 to f14) of the work site F1 to the reference point Ps1. The distance L1 referred to here is the shortest distance (distance on a line perpendicular to the outline) from the outline (first to fourth outlines f11 to f14) to the reference point Ps1.

Specifically, in the example of FIG. 9, the position of the work vehicle 10, when the distance L1 from the outline to the reference point Ps1 is less than a predetermined threshold value, is set as the row-stop position. The "threshold value" referred to here is a value acquired by adding a margin value L2 to 1.5 times of the work width W1 (W1×1.5+L2). In this embodiment, the row-stop width W2 is also acquired on the basis of the distance L1. Here, the distance L1 can be calculated at any time from the current position of the work vehicle 10 calculated by the positioning device 16. Therefore, according to this embodiment, even when the work vehicle 10 is traveling, it is possible to set the row-stop position at any time.

As described above, in this embodiment, the work-support processing unit 133 sets the row-stop position on the basis of the work width W1 in the work vehicle in addition to the outline information. Therefore, as compared with the case where the work width W1 is not used, the row-stop control can be executed at a more appropriate position.

Figure 10:
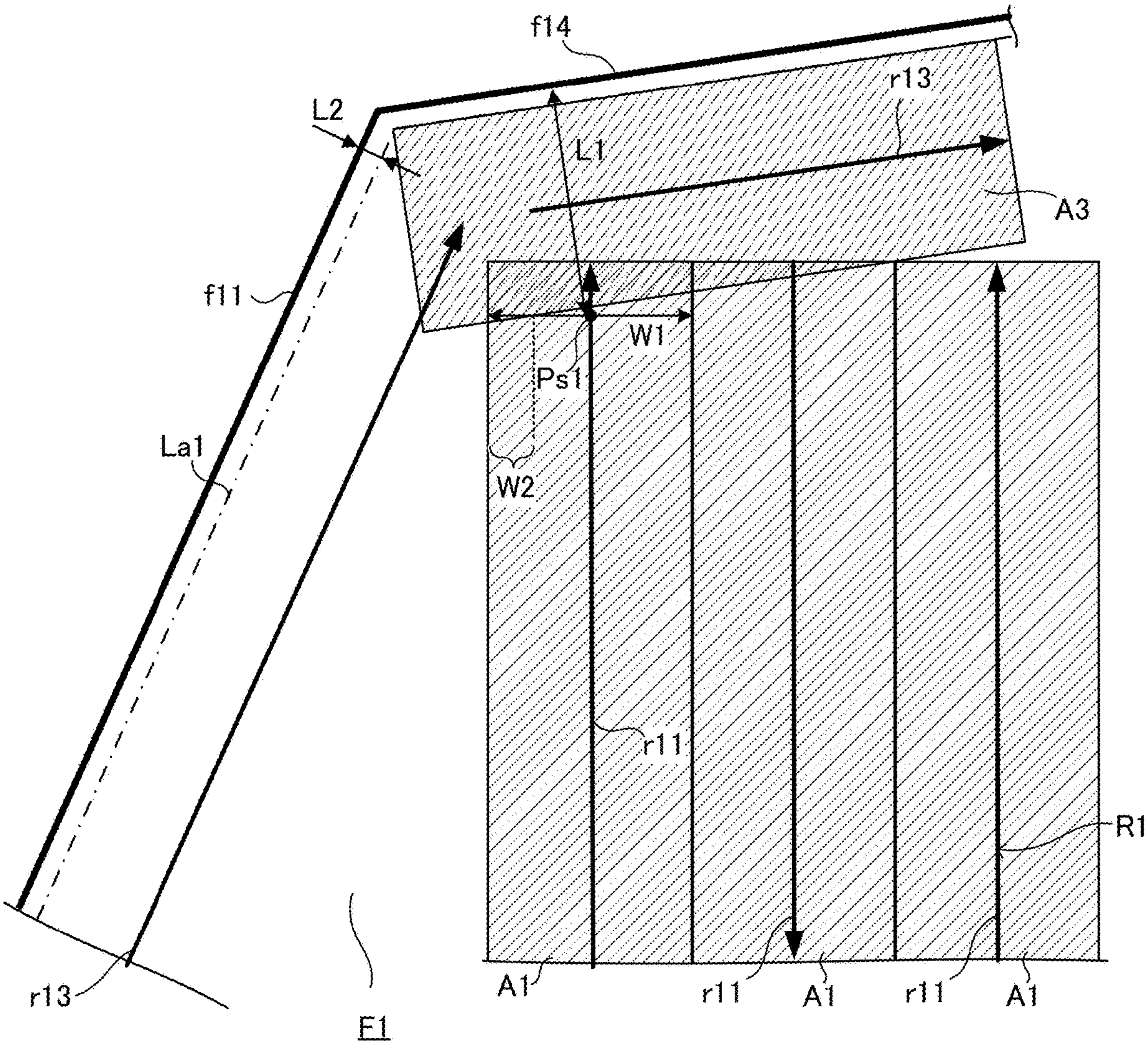
FIG. 10 is a schematic plan view illustrating an operation example of the row-stop control of the work vehicle according to the embodiment 1.

In addition, as in the example shown in FIG. 10, even when the fourth outline f14 located on the extension line of the work route r11 is inclined with respect to the work route r11, similarly to the case of FIG. 9, the position of the work vehicle 10 when the distance from the outline to the reference point Ps1 is less than the predetermined threshold value is set as the row-stop position. That is, in this case, the passing region A1 through which the operating machine 12 passes, when the work vehicle 10 travels on the work route r11, and the passing region A3 when traveling on the outer-peripheral work route r13 along the fourth outline f14 partially overlap with each other. Therefore, even in the example of FIG. 10, the row-stop position is set on the work route r11.

Figure 11:
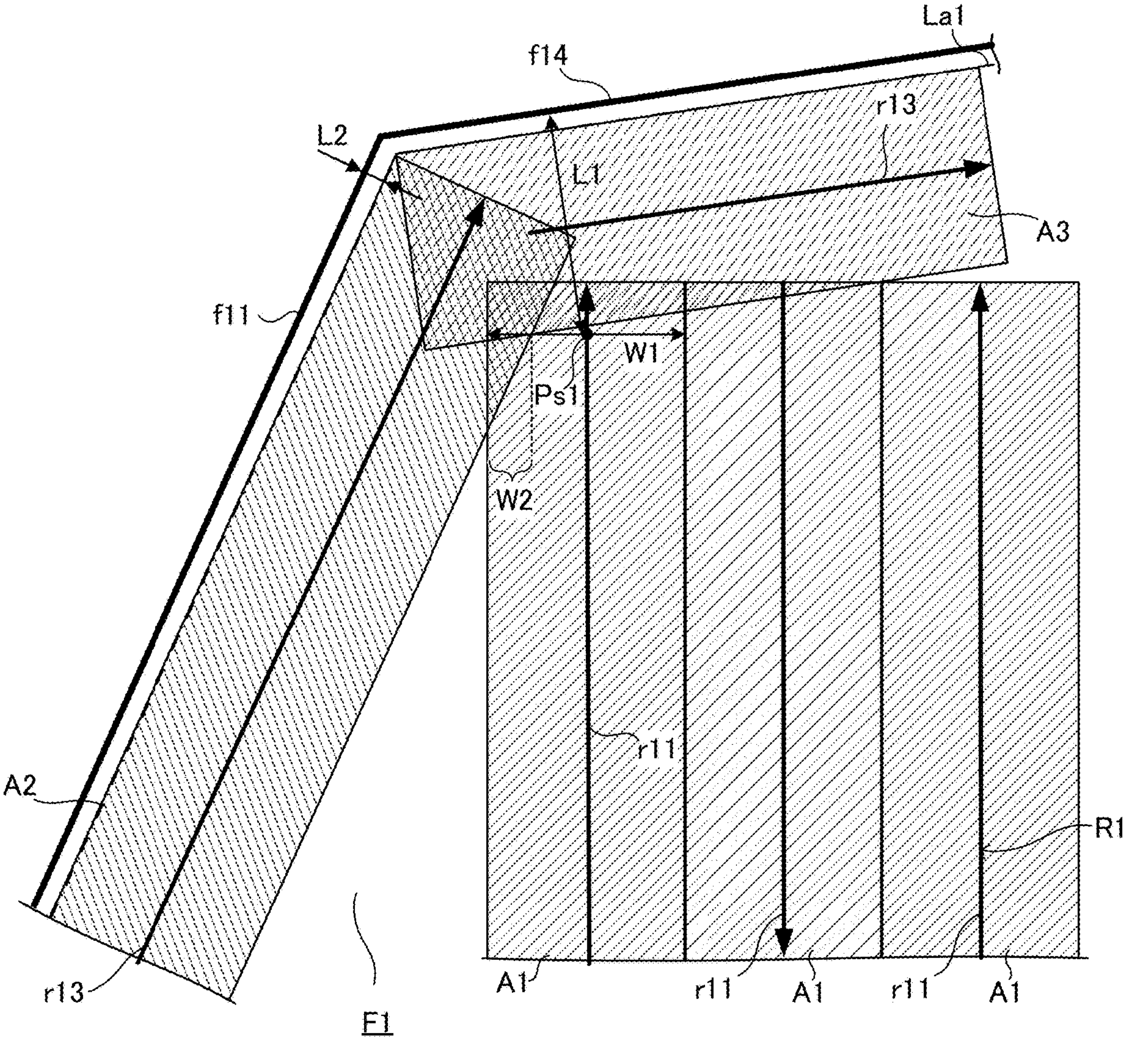
FIG. 11 is a schematic plan view illustrating an operation example of the row-stop control of the work vehicle according to the embodiment 1.

Furthermore, in the work site F1 having a shape as exemplified in FIG. 10, as shown in FIG. 11, both the passing region A2 and the passing region A3 partially overlap with the passing region A1 through which the operating machine 12 passes when traveling on the work route r11. In this case, as the row-stop width W2, a plurality of (two) values, that is, the width of the overlapping region of the passing region A1 and the passing region A2 and the width of the overlapping region of the passing region A1 and the passing region A3 are specified. Thus, when a plurality of values are specified as the row-stop width W2 as above, the work-support processing unit 133 specifies the maximum value of the plurality of values as the row-stop width W2.

In short, if the reference point Ps1 is present in front of the position shown in FIG. 11 (rear in the traveling direction) while the work vehicle 10 is traveling, the width of the overlapping region of the passing region A1 and the passing region A2 is larger than the width of the overlapping region of the passing region A1 and the passing region A3. Therefore, if the reference point Ps1 is present in front of the position shown in FIG. 11, the width of the overlapping region of the passing region A1 and the passing region A2 is specified as the row-stop width W2. On the other hand, when the reference point Ps1 passes the position shown in FIG. 11 during the traveling of the work vehicle 10, the width of the overlapping region of the passing region A1 and the passing region A3 becomes larger than the width of the overlapping region of the passing region A1 and the passing region A2. Therefore, after the reference point Ps1 passes the position shown in FIG. 11, the width of the overlapping region of the passing region A1 and the passing region A3 is specified as the row-stop width W2.

As a result, the row-stop width W2 can be continuously changed, and it is possible to execute the appropriate row-stop control in the work site F1 having various shapes.

Furthermore, in this embodiment, the reference point Ps1 is set at the center part in the left-right direction D3 at the rear end part of the operating machine 12, but this is not limiting, and it can be set at any position relative to the work vehicle 10. For example, the reference point Ps1 may be set at the center (center of gravity) of the operating machine 12 or the center of the machine body 11 in a plan view.

Furthermore, the position of the reference point Ps1 may be changed in accordance with a moving speed (vehicle speed) of the work vehicle 10, delay time of the row-stop control (time lag from the operation of the row-stop lever to the actual row stop) or the like. For example, the reference point Ps1 may move toward the front of the machine body 11 as the vehicle speed increases. As a result, even if the row-stop lever is operated after the work vehicle 10 has reached the row-stop position, a delay in the row-stop control is less likely to occur. Alternatively, in a case where the increase/decrease tendency of the row-stop width W2 is specified, by executing the row-stop control such that the row-stop width becomes slightly larger or smaller than the specified row-stop width W2, the delay of the row-stop control is less likely to occur.

In addition, the work-support processing unit 133 controls the moving speed (vehicle speed) of the work vehicle 10 in accordance with the start position and the end position of the row-stop control. That is, in consideration of a delay time of the row-stop control (time lag from the operation of the row-stop lever to the actual row stop) and the like, it is preferable to lower the vehicle speed at the start position at which the row-stop control is executed and at the end position at which the row-stop control is cancelled. In particular, when it is necessary to quickly switch between execution and cancellation of the row-stop control such as when the distance over which the row-stop control is executed is short, it is preferable to lower the vehicle speed from the start position to the end position of the row-stop control so that the row-stop control can be executed more appropriately.

Here, the work-support processing unit 133 suppresses the moving speed (vehicle speed) of the work vehicle 10 to a predetermined speed or less at least at the start position of the row-stop control. As a result, delay in the start of the row-stop control can be prevented more easily, and the row-stop control can be executed more appropriately.

Furthermore, in the control method according to this embodiment, the work site F1 includes the inner side region F11 in which the work vehicle 10 is caused to reciprocatingly travel along the work direction, and an outer peripheral region F12 in which the work vehicle 10 is caused to travel around along the outer periphery of the inner side region F11. Here, the work-support processing unit 133 sets the row-stop position on the basis of the number of times of go-around of the work vehicle 10 in the outer peripheral region F12 in addition to the outline information.

In short, in a case where a plurality of the work routes r11 are generated while leaving widths corresponding to a plurality of strokes in the outer peripheral region F12 of the work site F1, and the outer-peripheral work route r13 corresponding to the plurality of strokes is generated along the outer periphery of the work site F1, the row-stop position may be set on the basis of the number of processes (the number of times of go-around) of the outer-peripheral work route r13. Basically, as the number of times of go-around increases, the outer-peripheral work route r13 is generated further inside and thus, the threshold value to be compared with the distance L1 from the outline to the reference point Ps1 is set large. According to this configuration, in a case where the number of times of go-around of the work vehicle 10 in the outer peripheral region F12 can be set, it is possible to set an appropriate row-stop position for each set number of times of go-around.

The work-support processing unit 133 may set the row-stop position also on the basis of the allowable limit line La1. That is, the outline information is defined by a distance to an inner side of the work site F1 with the outline of the work site F1 as a reference and includes information of the allowable limit line La1, which is a limit position at which the work vehicle 10 is allowed to protrude. The row-stop position may be set on the basis of the allowable limit line La1.

In this case, the row-stop position is set on the inner side of the allowable limit line La1 by all means. Then, the work-support processing unit 133 sets the row-stop position on the basis of the distance from the specific line (allowable limit line La1) to the reference point Ps1 with the allowable limit line La1 as the specific line.

When the allowable limit line La1 is set separately from the outline, the outer-peripheral work route r13 is generated not along the outline but along the allowable limit line La1. Therefore, since the row-stop position is set on the basis of the allowable limit line La1, even when the allowable limit line La1 is set separately from the outline as described above, the appropriate row-stop control can be executed.

Here, the position of the allowable limit line La1 can be changed (by the setting processing unit 214). The row-stop position is changed in accordance with the change of the position of the allowable limit line La1. That is, in the case where the row-stop position is set on the basis of the allowable limit line La1, when the allowable limit line La1 is changed, the row-stop position is also changed accordingly. As a result, even in a case where the allowable limit line La1 is set separately from the outline, it is possible to execute the appropriate row-stop control.

In addition, when the row-stop position is set on the basis of the distance L1 from the outline (first to fourth outlines f11 to f14) of the work site F1 to the reference point Ps1, the row-stop position may be set also on the outer-peripheral work route r13 in some cases. Thus, it is preferable not to set the row-stop position for a specific route (such as the outer-peripheral work route r13) even if the distance L1 is less than the threshold value. The determination on whether or not the route is a route for setting a row-stop position may be made by the operator or automatically by the work-support processing unit 133. Alternatively, the row-stop control may not be executed when the operator does not operate the row-stop lever, even if the row-stop position is set.

4.3 Overall Processing

Subsequently, the overall flow of the processing related to the row-stop control in the control method will be explained with reference to FIG. 12.

Figure 12:
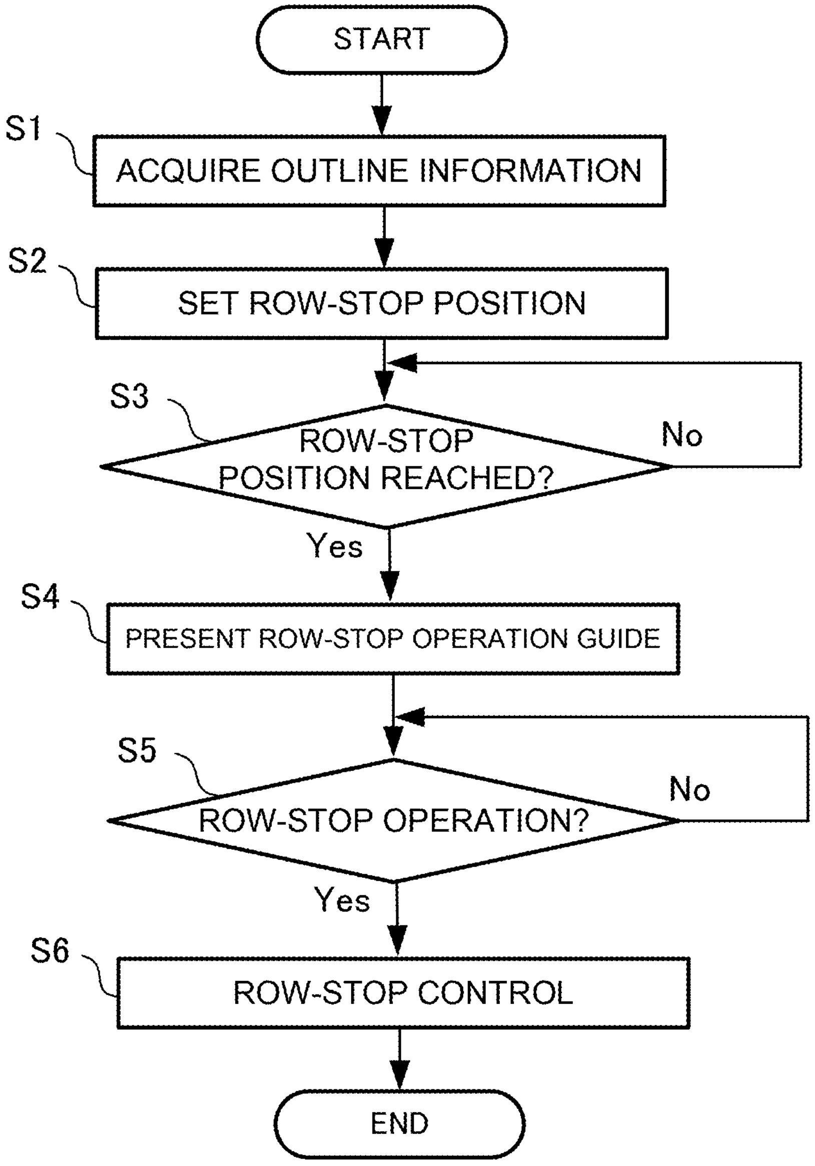
FIG. 12 is a flowchart illustrating an operation example of the control system for a work vehicle according to the embodiment 1.

As illustrated in FIG. 12, the acquisition processing unit 131 of the control system 1 acquires the outline information of the work site F1 (S1). Then, the work-support processing unit 133 of the control system 1 calculates the distances L1 (from the outline to the reference point Ps1) on the basis of the outline information and the current position of the work vehicle 10 at any time during the traveling of the work vehicle 10 and sets the row-stop position on the basis of the distance L1 (S2).

The work-support processing unit 133 determines whether or not the current position of the work vehicle 10 has reached the row-stop position (S3) and, if the position has been reached (S3: Yes), presents (displays) a "row-stop operation guide" for guiding the operation of the row-stop lever by the operator on the display device 18 (S4). Accordingly, when the operator operates the row-stop lever (S5: Yes), the row-stop control is executed (S6).

However, the flowchart shown in FIG. 12 is merely an example, and processing may be added or omitted as appropriate, and the order of the processing may be changed as appropriate.

5 Variation

Variations of the embodiment 1 will be listed below. The variations explained below can be applied in appropriate combination.

The control system 1 in the present disclosure includes a computer system. The computer system is mainly configured by one or more processors and one or more memories as hardware. The processor executes a program (control program for a work vehicle) recorded in the memory of the computer system, thereby realizing the functions as the control system 1 in the present disclosure. The program may be recorded in advance in the memory of the computer system, may be provided through an electric communication line, or may be provided by being recorded in a non-transitory recording medium such as a memory card, an optical disk, or a hard disk drive, that is readable by the computer system. In addition, a part or all of the functional units included in the control system 1 may be configured by an electronic circuit.

In addition, a configuration in which at least a part of the functions of the control system 1 is integrated in one housing is not an essential configuration of the control system 1, and the constituent elements of the control system 1 may be distributed and provided in a plurality of housings. To the contrary, in the embodiment 1, the functions distributed to the plurality of devices (for example, the control device 13 and the terminal device 20) may be integrated in one housing. Furthermore, at least a part of the functions of the control system 1 may be realized by a cloud (cloud computing) or the like.

In addition, the terminal device 20 is not limited to a general-purpose terminal such as a tablet terminal, a smartphone, a laptop computer or the like and may be configured by a dedicated terminal. Furthermore, a plurality of the terminal devices 20 may be associated with one unit of the work vehicle 10, and in this case, the one work vehicle 10 can be controlled by the plurality of terminal devices 20. To the contrary, one unit of the terminal device 20 may be associated with a plurality of the work vehicles 10, and in this case, the plurality of work vehicles 10 can be controlled by the one unit of terminal device 20.

In addition, the above-described target route R1 is merely an example and can be changed as appropriate. For example, the work direction of the work vehicle 10 (the direction of the work route r11) and/or the travel order of the work route r11 or the like can be changed as appropriate.

In addition, it is not indispensable that the setting of the row-stop position is performed while the work vehicle 10 is traveling. For example, the row-stop position may be set before the start of the automated travel of the work vehicle 10. In this case, the work vehicle 10 executes the row-stop control in accordance with the row-stop position set in advance.

Embodiment 2

The control method of the work vehicle 10 according to this embodiment is different from that of the embodiment 1 in a point that the work-support processing unit 133 executes the row-stop control by directly controlling the operating machine 12. Hereinafter, the similar configurations as those of the embodiment 1 are given the common signs, and the explanation will be omitted as appropriate.

In the control method of the work vehicle 10 according to this embodiment, when the work vehicle 10 reaches the row-stop position, the work-support processing unit 133 executes shut-off control of a row clutch of any one of the work rows Vr1 to Vr8 and executes the row-stop control to stop the work of the work rows Vr1 to Vr8. As a result, the row-stop control can be executed at an appropriate position without operation by the operator of the row-stop lever.

In addition, the work-support processing unit 133 may present to the operator that the row-stop control is to be executed from the display device 18 or the like when the row-stop control is to be executed. In this case, it is preferable that the work-support processing unit 133 also presents which of the plurality of work rows Vr1 to Vr8 is to be set to non-work. And when the operator determines that the row-stop control is inappropriate, the operator can stop the row-stop control.

The configuration of the embodiment 2 can be adopted in appropriate combination with various configurations (including the variation) explained in the embodiment 1.

Supplementary Note of the Invention

Hereinafter, an outline of the invention extracted from the above-described embodiments will be supplementarily noted. Note that each configuration and processing function explained in the following Supplementary Notes may be selected and combined as appropriate.

Supplementary Note 1

A control method of a work vehicle, which is a control method of a work vehicle, capable of working on a plurality of work rows aligned in a direction intersecting a traveling direction, while traveling in a work site, having acquisition of outline information based on an outline of the work site and setting of a row-stop position for executing row-stop control that sets a part of the plurality of work rows to non-work in the work site on the basis of the outline information.

Supplementary Note 2

The control method of a work vehicle described in the Supplementary Note 1, in which the work site includes an inner side region in which the work vehicle is caused to reciprocatingly travel along a work direction and an outer peripheral region in which the work vehicle is caused to travel around along an outer periphery of the inner side region, and in addition to the outline information, the row-stop position is set on the basis of the number of times of go-around of the work vehicle in the outer peripheral region.

Supplementary Note 3

The control method of a work vehicle described in Supplementary Note 1 or 2, in which the outline information includes information of an allowable limit line which is defined by a distance to an inner side of the work site with an outline of the work site as a reference and is a limit position at which the work vehicle is allowed to protrude, and the row-stop position is set on the basis of the allowable limit line.

Supplementary Note 4

The control method of a work vehicle described in Supplementary Note 3, in which a position of the allowable limit line is changeable, and the row-stop position is changed in accordance with a change of the position of the allowable limit line.

Supplementary Note 5

The control method of a work vehicle described in any one of Supplementary Notes 1 to 4, in which a moving speed of the work vehicle is controlled in accordance with a start position and an end position of the row-stop control.

Supplementary Note 6

The control method of a work vehicle described in Supplementary Note 5, in which a moving speed of the work vehicle is suppressed to a predetermined speed or less at least at a start position of the row-stop control.

Supplementary Note 7

The control method of a work vehicle described in any one of Supplementary Notes 1 to 6, in which in addition to the outline information, the row-stop position is set on the basis of a work width in the work vehicle.

Supplementary Note 8

The control method of a work vehicle described in any one of Supplementary Notes 1 to 7, in which the row-stop position is set on the basis of a distance from a specific line included in the outline information to a reference point set with respect to the work vehicle.

Supplementary Note 9

The control method of a work vehicle described in any one of Supplementary Notes 1 to 8, further having when the row-stop position is to be set, specifying of a row-stop width corresponding to the number of work rows to be set to non-work among the plurality of work rows at the row-stop position.

Supplementary Note 10

The control method of a work vehicle described in Supplementary Note 9, in which, when a plurality of values are specified as the row-stop width, a maximum value of the plurality of values is specified as the row-stop width.

Supplementary Note 11

A control method of a work vehicle, which is a control method of a work vehicle, capable of working on a plurality of work rows aligned in a direction intersecting a traveling direction while traveling in a work site, the work site including an inner side region in which the work vehicle is caused to reciprocatingly travel along a work direction and an outer peripheral region in which the work vehicle is caused to travel around along an outer periphery of the inner side region, having acquisition of outline information based on an outline of the work site and obtainment of an overlapping region of a passing region of the work vehicle which reciprocatingly travels in the inner side region and a passing region of the work vehicle which travels around in the outer peripheral region on the basis of the outline information.

Supplementary Note 12

A control program for a work vehicle for causing one or more processors to execute the control method of a work vehicle described in any one of Supplementary Notes 1 to 11.

REFERENCE SIGNS LIST

1 Control system for work vehicle
10 Work vehicle
11 Machine body
100 Work system
131 Acquisition processing unit
133 Work-support processing unit
A1, A2, A3 Passing region
A10 Overlapping region
D2 Traveling direction (front-rear direction)
F1 Work site
F11 Inner side region
F12 Outer peripheral region
f11 to f14 First to fourth outlines (outlines)
L1 Distance
L2 Margin value
La1 Allowable limit line
P1 Reference point
Vr1 to Vr8 Work row
W1 Work width
W2 Row-stop width

The invention claimed is:

1. A processor-implemented control method of a work vehicle capable of working on a plurality of work rows aligned in a direction intersecting a traveling direction, while traveling in a work site, comprising:

acquiring of outline information based on an outline of the work site;

obtaining an overlapping region, wherein the overlapping region is indicative of an overlap of an inner passing region of the work vehicle and an outer passing region of the work vehicle;

setting of a row-stop position for executing row-stop control during performance of agricultural operations by the vehicle, wherein the row-stop control sets a partial number of work rows of the plurality of work rows to non-work in the work site on the basis of the outline information, the partial number of work rows being less than all of the plurality of work rows; and executing agricultural operations by the work-vehicle, wherein row-stop control is executed in the overlapping region based on the row stop position.

2. The control method of a work vehicle according to claim 1, wherein the work site includes an inner side region in which the work vehicle is caused to reciprocatingly travel along a work direction and an outer peripheral region in which the work vehicle is caused to travel around along an outer periphery of the inner side region, and in addition to the outline information, the row-stop position is set on the basis of a number of times of go-around of the work vehicle in the outer peripheral region.

3. The control method of a work vehicle according to claim 1, wherein the outline information includes information of an allowable limit line which is defined by a margin value, wherein the margin value is a distance to an inner side of the work site with the outline of the work site as a reference, the allowable limit line being a limit position to which the work vehicle is allowed to protrude, and the row-stop position is further set on the basis of the allowable limit line.

4. The control method of a work vehicle according to claim 3, wherein a position of the allowable limit line is changeable, and the row-stop position is changed in accordance with a change to the position of the allowable limit line.

5. The control method of a work vehicle according to claim 1, wherein a moving speed of the work vehicle is controlled in accordance with a start position of the row-stop control and an end position of the row-stop control.

6. The control method of a work vehicle according to claim 5, wherein a moving speed of the work vehicle is suppressed to a predetermined speed or less at least at the start position of the row-stop control.

7. The control method of a work vehicle according to claim 1, wherein the row-stop position is set on the basis of a work width in the work vehicle in addition to the outline information.

8. The control method of a work vehicle according to claim 1, wherein the row-stop position is further set on the basis of a distance from a specific line included in the outline information to a reference point set with respect to the work vehicle.

9. The control method of a work vehicle according to claim 1, further comprising:

specifying of a row-stop width, the row-stop width corresponding to the partial number of work rows to be set to non-work at the row-stop position, when the row-stop position is set.

10. The control method of a work vehicle according to claim 9, wherein when a plurality of values are specified as the row-stop width, a maximum value of the plurality of values is specified as the row-stop width.

11. A processor-implemented control method of a work vehicle capable of working on a plurality of work rows aligned in a direction intersecting a traveling direction while traveling in a work site, the control method comprising:

acquiring outline information based on an outline of the work site;

obtaining an overlapping region, wherein the overlapping region is indicative of an overlap of an inner passing region of the work vehicle and an outer passing region of the work vehicle, wherein the inner passing region is comprised within an inner side region of the work site in which the work vehicle reciprocatingly travels along a work direction, and wherein the outer passing region is comprised in an outer peripheral region in which the work vehicle is caused to travel around along an outer periphery of the inner side region, the outer peripheral region being determined on the basis of the outline information; and executing agricultural operations by the work vehicle, wherein row-stop control is executed in the overlapping region by setting a partial number of work rows of the plurality of work rows in the overlapping region to non-work, wherein the partial number of work rows is less than all of the plurality of work rows.

12. A non-transitory computer readable medium embodying instructions, which, when executed by at least one processor, performs the control method of a work vehicle according to claim 1.

13. A control system comprised in a work vehicle, the work vehicle being capable of working on a plurality of work rows aligned in a direction intersecting a traveling direction, while traveling on a work site, wherein the control system obtains an overlapping region, wherein the overlapping region is indicative of an overlap of an inner passing region of the work vehicle and an outer passing region of the work vehicle; the control system comprising:

an acquisition processing unit that acquires outline information based on an outline of the work site; and a work-support processing unit that sets a row-stop position for executing row-stop control during performance of agricultural operations by the vehicle, wherein the row-stop control sets a partial number of work rows of the plurality of work rows to non-work in the work site on the basis of the outline information, the partial number of work rows being less than all of the plurality of work rows, and controls execution of agricultural operations by the work-vehicle, wherein row-stop control is executed in the overlapping region based on the row stop position.

14. A work system comprising:

the control system for a work vehicle according to claim 13; and a machine body of the work vehicle.

* * * * *